US012393544B2

(12) United States Patent
Desai et al.

(10) Patent No.: US 12,393,544 B2
(45) Date of Patent: Aug. 19, 2025

(54) DYNAMIC DIE-TO-DIE SERIAL LANE CONFIGURATION

(71) Applicant: QUALCOMM INCORPORATED, San Diego, CA (US)

(72) Inventors: Kunal Desai, Bangalore (IN); Deepak Kumar Agarwal, Bangalore (IN)

(73) Assignee: QUALCOMM Incorporated, San Diego, CA (US)

( * ) Notice: Subject to any disclaimer, the term of this patent is extended or adjusted under 35 U.S.C. 154(b) by 230 days.

(21) Appl. No.: 18/302,535

(22) Filed: Apr. 18, 2023

(65) Prior Publication Data

US 2024/0354275 A1 Oct. 24, 2024

(51) Int. Cl.
*G06F 11/00* (2006.01)
*G06F 11/07* (2006.01)
*G06F 13/42* (2006.01)

(52) U.S. Cl.
CPC ...... *G06F 13/4282* (2013.01); *G06F 11/0745* (2013.01); *G06F 11/076* (2013.01)

(58) Field of Classification Search
CPC ............. G06F 13/4282; G06F 11/0745; G06F 11/076; G06F 11/221
See application file for complete search history.

(56) References Cited

U.S. PATENT DOCUMENTS

| | | | | |
|---|---|---|---|---|
| 6,684,435 B1* | 2/2004 | Wells | ...................... | A47C 27/07 5/248 |
| 6,727,722 B2* | 4/2004 | Whetsel | ................... | H01L 22/34 324/762.03 |
| 6,735,543 B2* | 5/2004 | Douskey | ........ | G01R 31/318385 716/108 |
| 7,412,639 B2* | 8/2008 | Volkerink | ...... | G01R 31/318511 714/736 |
| 7,486,725 B2* | 2/2009 | Chen | ................... | H04B 17/0085 714/724 |
| 7,870,445 B2* | 1/2011 | Saponas | ............. | G01R 31/3171 714/704 |
| 8,933,447 B1* | 1/2015 | Rahman | ......... | G01R 31/318516 257/797 |

(Continued)

OTHER PUBLICATIONS

International Search Report (ISR) and Written Opinion (ISR = EPO) for related PCT App. No. PCT/US2024/018963, filed on Mar. 7, 2024, entitled, "Dynamic Die-to-Die Serial Lane Configuration," report transmitted on Jun. 26, 2024, nine pages.

*Primary Examiner* — Amine Riad
(74) *Attorney, Agent, or Firm* — Smith Tempel Blaha LLC/Qualcomm

(57) ABSTRACT

A die-to-die serial data link may be dynamically configured to exclude lanes associated with data errors. In a test mode, data may be transmitted from a first die to a second die over lanes of the link. In the second die, data received on the link in the test mode may be compared with an expected data pattern to detect any bit mismatches. When there are no more than a threshold number of mismatched bits, a receive path in the second die may be configured to use all of the lanes. When there are more than the threshold number of mismatched bits, a sub-group of the lanes that are not associated with mismatched bits may be determined, and the receive path in the second die may be configured to use the sub-group of lanes. In the first die, a transmit path may be configured to use the sub-group of lanes.

23 Claims, 11 Drawing Sheets

(56) References Cited

U.S. PATENT DOCUMENTS

| | | | | |
|---|---|---|---|---|
| 8,966,419 | B2* | 2/2015 | Goel | G01R 31/318513 |
| | | | | 716/113 |
| 10,120,025 | B2* | 11/2018 | Whetsel | G01R 31/318544 |
| 10,429,441 | B2* | 10/2019 | Chakraborty | G01R 31/3177 |
| 10,605,860 | B2* | 3/2020 | Li | G01R 31/31703 |
| 2011/0041019 | A1* | 2/2011 | Whetsel | G01R 31/318572 |
| | | | | 714/E11.02 |
| 2011/0316572 | A1* | 12/2011 | Rahman | G01R 31/2853 |
| | | | | 257/E23.141 |
| 2018/0253396 | A1* | 9/2018 | Zhao | H04W 76/14 |
| 2019/0033368 | A1* | 1/2019 | Pappu | G01R 31/318513 |
| 2020/0049767 | A1* | 2/2020 | Kim | G01R 31/31725 |
| 2023/0098514 | A1 | 3/2023 | Meaney et al. | |
| 2023/0299050 | A1* | 9/2023 | Mangilal | G01R 31/318594 |
| | | | | 257/48 |

\* cited by examiner

DYNAMIC DIE-TO-DIE SERIAL LANE CONFIGURATION

DESCRIPTION OF THE RELATED ART

A computing device may include multiple subsystems, cores, or other components. The multiple subsystems, cores or other components may be included within the same integrated circuit chip (i.e., die) or in different chips. A "system-on-a-chip" or "SoC" is an example of a chip that integrates numerous components to provide system-level functionality. For example, an SoC may include one or more types of processors, such as central processing units ("CPU"s), graphics processing units ("GPU"s), digital signal processors ("DSP"s), and neural processing units ("NPU"s). An SoC may include other processing subsystems, such as a transceiver or "modem" subsystem that provides wireless connectivity, a memory subsystem, etc.

Two chips, such as, for example, two SoCs, may communicate with each other via a die-to-die ("D2D") serial data communication link. The reliability of a D2D serial data link may be adversely impacted by environmental effects. Data on the D2D serial data link may be corrupted by environmental conditions such as radiation, cosmic rays, extreme temperatures, etc. Development of high-reliability, safety-critical computing systems, such as, for example, automotive control systems, may demand higher reliability D2D serial data link communication.

Error detection and correction ("EDAC") techniques have been used in data communication link systems to improve reliability. Error detection relates to detecting errors and providing a notification that the error occurred, while error correction relates to transforming erroneous data into corrected data using error-correction code ("ECC") algorithms. For example, a technique known as Single-Error Correction/Double-Error Detection ("SECDED") may be capable of correcting single-bit errors in a received data word and detecting (but not correcting) double-bit errors in a received data word. If a double-bit error, which the SECDED circuitry cannot correct, occurs in a data communication link of a safety-critical system, the link may be treated as unusable for safety reasons. If the cause of the data corruption is persistent, even re-booting the system may not restore full operation of the link. It would be desirable to provide methods and systems for more robust D2D serial data link operation.

SUMMARY OF THE DISCLOSURE

Systems, methods, and other examples are disclosed for dynamically configuring a die-to-die serial data link.

An exemplary method for dynamically configuring a die-to-die serial data link may include transmitting, by a first die, a test data pattern over a plurality of first-die-to-second-die lanes of the die-to-die serial data link in response to a test mode. The method may also include receiving, by a second die, a received data pattern on the first-die-to-second-die lanes in response to the test mode. The method may further include determining, by the second die, the number of mismatched bits between the received data pattern and the predetermined data pattern. The method may still further include configuring, by the second die, a second-die receive path to use all of the plurality of first-die-to-second-die lanes when there are no more than a threshold number of mismatched bits. The method may yet further include determining, by the second die, a sub-group of the first-die-to-second-die lanes not associated with mismatched bits when there are more than the threshold number of mismatched bits. The method may also include configuring, by the second die, the second-die receive path to use the sub-group of first-die-to-second-die lanes when there are more than the threshold number of mismatched bits.

An exemplary system for dynamically configuring a die-to-die serial data link may include first control and self-test circuitry in a first die, second control and self-test circuitry in a second die, and second routing circuitry in the second die. The first control and self-test circuitry may be configured to transmit a test data pattern over a plurality of first-die-to-second-die lanes of the die-to-die serial data link in response to a test mode. The second control and self-test circuitry may be configured to, in response to the test mode, receive a data pattern on the first-die-to-second-die lanes, determining the number of mismatched bits between the received data pattern and a predetermined data pattern, and determine a sub-group of the first-die-to-second-die lanes not associated with mismatched bits when there are more than the threshold number of mismatched bits. The second routing circuitry may be configured to configure a second-die receive path to use all of the plurality of first-die-to-second-die lanes when there are no more than a threshold number of mismatched bits and to configure the second-die receive path to use the sub-group of first-die-to-second-die lanes when there are more than the threshold number of mismatched bits.

Another exemplary system for dynamically configuring a serial data link may include first serializer circuitry in a first die, first multiplexing circuitry in the first die, first self-test generator circuitry in the first die, first deserializer circuitry in the first die, first demultiplexing circuitry in the first die, and first control circuitry in the first die. The first serializer circuitry may have an output coupled to first-die-to-second-die lanes of the serial data link. The first multiplexing circuitry may have an output coupled to an input of the first serializer circuitry. The first self-test generator circuitry may be configured to provide a test data pattern to the first multiplexing circuitry in response to a test mode. The first deserializer circuitry may have an input coupled to second-die-to-first-die lanes of the serial data link. The first demultiplexing circuitry may have an input coupled to an output of the first deserializer circuitry. The first control circuitry may be configured to receive link test result information indicating a group of lanes in response to the test mode. The first control circuitry may further be configured to use the first multiplexing circuitry to configure a first-die transmit path to use all first-die-to-second-die lanes when the group of lanes indicated by the link test result information consists of all first-die-to-second-die lanes. The first control circuitry may still further be configured to configure the first-die transmit path to use a sub-group of the first-die-to-second-die lanes when the group of lanes indicated by the link test result information consists of the sub-group of the first-die-to-second-die lanes.

Still another exemplary system for dynamically configuring a serial data link may include means for transmitting a test data pattern over first-die-to-second-die lanes of the serial data link in response to a test mode. The system may also include means for receiving a received data pattern on the first-die-to-second-die lanes in response to the test mode. The system may further include means for determining the number of mismatched bits between the received data pattern and a predetermined data pattern. The system may still further include means for configuring a second-die receive path to use all of the plurality of first-die-to-second-die lanes when there are no more than a threshold number of mismatched bits. The system may yet further include means for determining a sub-group of the first-die-to-second-die lanes not associated with mismatched bits when there are more than the threshold number of mismatched bits. The system may also include means for configuring the second-die receive path to use the sub-group of first-die-to-second-die lanes when there are more than the threshold number of mismatched bits.

BRIEF DESCRIPTION OF THE DRAWINGS

In the Figures, like reference numerals refer to like parts throughout the various views unless otherwise indicated. For reference numerals with letter character designations such as "102A" or "102B", the letter character designations may differentiate two like parts or elements present in the same Figure. Letter character designations for reference numerals may be omitted when it is intended that a reference numeral to encompass all parts having the same reference numeral in all Figures.

DETAILED DESCRIPTION

The word "exemplary" is used herein to mean "serving as an example, instance, or illustration." The word "illustrative" may be used herein synonymously with "exemplary." Any aspect described herein as "exemplary" is not necessarily to be construed as preferred or advantageous over other aspects.

Figure 1:
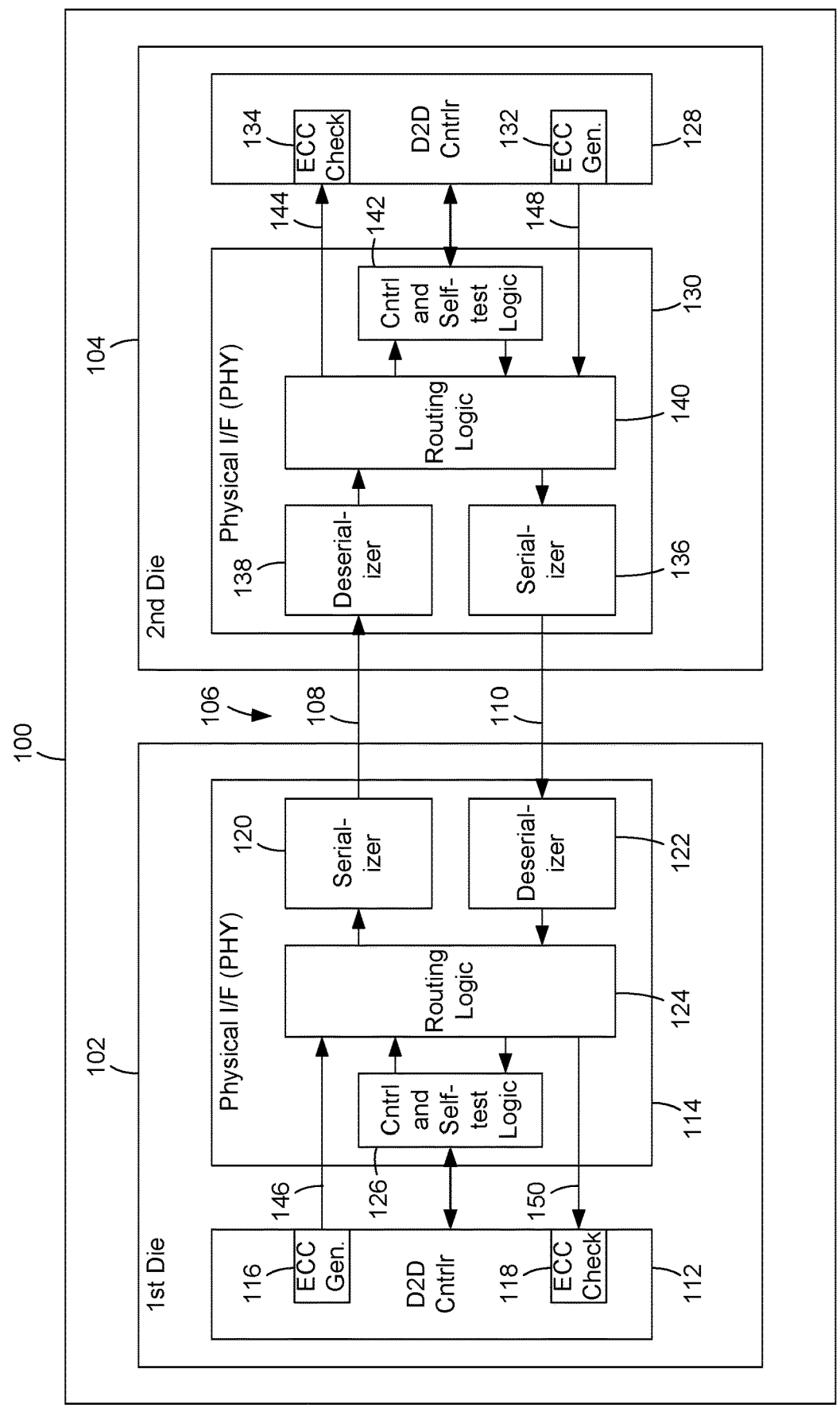
FIG. 1 is a block diagram of a system for dynamically configuring a die-to-die serial data link, in accordance with exemplary embodiments.

As shown FIG. 1, in an illustrative or exemplary embodiment a system or device 100 may include two dies 102 and 104, which may be referred to for convenience as the first die 102 and the second die 104. The first die 102 and second die 104 may communicate data between them over a die-to-die ("D2D") serial data link 106. The link 106 may comprise any number of serial data lanes, but the lanes are not individually shown in FIG. 1 for purposes of clarity. The link 106 may be bidirectional, comprising two or more first-die-to-second-die lanes 108 configured to communicate data in a direction from the first die 102 to the second die 104, and two or more second-die-to-first-die lanes 110 configured to communicate data in a direction from the second die 104 to the first die 102. The device 100 may be (or may be included in), for example, a safety-critical computing system (not shown in FIG. 1). An example of a safety-critical computing system is an automotive control system.

Each die 102 and 104 may include other components and subsystems that are not shown for purposes of clarity, such as processors, memories, subsystems, data buses or other data communication interconnects, etc. Such a processor, memory, subsystem, etc., in one of the dies 102 and 104 may operate as a source of data transmitted to the other of the dies 102 and 104 over the link 106, or as a destination for data received from the other of the dies 102 and 104 over the link 106.

In the first die 102, a D2D controller 112 and a D2D physical interface or "PHY" 114 may together control transmission of data over the first-die-to-second-die lanes 108 and reception of data over the second-die-to-first-die lanes 110. Although processors or other data sources and data destinations are not shown for purposes of clarity, the D2D controller 112 may direct data from such a data source to the PHY 114 for transmission and direct received data from the PHY 114 to such a data destination. Such data may be referred to as "functional" or "mission-mode" data in contrast with data used for test purposes or other purposes. A test mode is described below, in which test data is transmitted in place of functional data. In the test mode, the link 106 is tested to detect whether any of the first-die-to-second-die lanes 108 and second-die-to-first-die lanes 110 are not operating correctly.

An error-correction code ("ECC") generator 116 in or associated with the D2D controller 112 may generate ECC tags for data provided to the PHY 114. Similarly, an ECC checker/corrector 118 in or associated with the D2D controller 112 may perform an ECC check on data received from the PHY 114. As such ECC tag generating and checking/correcting is well understood by one of ordinary skill in the art, such aspects are not described herein in further detail. Nevertheless, it may be appreciated that the ECC checking operation performed by the ECC checker/corrector 118 may detect up to a threshold number of erroneous bits in a received data word and may correct up to another threshold number of erroneous bits. For example, one type of ECC checking operation or algorithm, known as Single-Error Correction/Double-Error Detection ("SECDED"), may detect up to two erroneous bits and correct up to one erroneous bit.

The PHY 114 may include a serializer 120 and a deserializer 122. The input of the serializer 120 may be coupled to an output of routing circuitry/logic 124. The output of the serializer may be coupled to an input or origin end of the first-die-to-second-die lanes 108 of the link 106. The serializer 120 may be configured to receive the above-referenced functional data in a parallel format from the D2D controller 112 or a data source via the routing circuitry/logic 124, and convert that data to a serial format for transmission over the first-die-to-second-die lanes 108. The input of the deserializer 122 may be coupled to an output or destination end of the second-die-to-first-die lanes 110 of the link 106. The deserializer 122 may be configured to receive serial-format data from the second-die-to-first-die lanes 110 and convert that received data to a parallel format. The output of the deserializer 122 may be coupled to an input of the routing circuitry/logic 124. The received parallel-format data may be provided to the D2D controller 112 or a data destination via the routing circuitry/logic 124.

The PHY 114 may also include control and self-test circuitry/logic 126. As described below, the control and self-test circuitry/logic 126 may be configured to provide test data to the routing circuitry/logic 124 and to receive link test result information from the routing circuitry/logic 124. The control and self-test circuitry/logic 126 may also be configured to provide configuration control signals to the routing circuitry/logic 124. There may be various configuration control signals, as described below. Some of the configuration control signals may be based on the link test result information.

In response to some of the configuration control signals, the routing circuitry/logic 124 may be configured to select between receiving the above-referenced functional data from the D2D controller 112 and receiving test data from the control and self-test circuitry/logic 126. In other words, such a control signal may indicate whether the PHY 114 is in the test mode or the functional mode (also referred to as mission mode).

The above-referenced link test result information may be received from the second die 104, which may generate the link test result information based on whether the above-referenced test data was received correctly at the second die 104. The link test result information may indicate a group of the first-die-to-second-die lanes 108 over which the test data was correctly received at the second die 104. The group may consist of all of the first-die-to-second-die lanes 108 or only a sub-group of the first-die-to-second-die lanes 108. As described below, if the link test result information indicates that the test data was not received correctly at the second die 104 on some of the first-die-to-second-die lanes 108, the routing circuitry/logic 124 may exclude some of the first-die-to-second-die lanes 108 that are associated with erroneously received data from being used to transmit functional data after the test mode is exited.

The second die 104 may include components or elements that are similar to, and thus correspond to, the above-described components or elements of the first die 102: a D2D controller 128 similar to the above-described D2D controller 112; a PHY 130 similar to the above-described PHY 114; an ECC generator 132 similar to the above-described ECC generator 116; an ECC checker/corrector 134 similar to the above-described ECC checker/corrector 118; a serializer 136 similar to the above-described serializer 120; a deserializer 138 similar to the above-described deserializer 122; routing circuitry/logic 140 similar to the above-described routing circuitry/logic 124; and control and self-test circuitry/logic 142 similar to the above-described control and self-test circuitry/logic 126. As the descriptions above of structures and functions of elements of the first die 102 apply to the corresponding elements of the second die 104, such descriptions are not repeated here with respect to the second die 104. The following are descriptions of further functions of some of these elements, and the descriptions apply to corresponding elements in both dies 102 and 104.

In the test mode, the control and self-test circuitry/logic 142 may be configured to analyze the data that is received in response to the above-referenced test data that was transmitted over the first-die-to-second-die lanes 108 and determine whether there are any errors in the received data. For example, as described below, the control and self-test circuitry/logic 142 may compare the received data with a predetermined data pattern to detect any mismatched bits between the received data and the predetermined data pattern. When the results of such a comparison or other analysis indicate that more than a threshold number of bits were erroneously received, the control and self-test circuitry/logic 142 may be configured to determine a sub-group of the first-die-to-second-die lanes 108 not associated with the erroneously received bits.

The control and self-test logic 142 may be configured to provide control signals to the routing circuitry/logic 140 based on the results of such a comparison or other analysis. When the results of the comparison or other analysis indicate there are no more than a threshold number of erroneously received bits, the routing circuitry/logic 140 may be configured to couple the second-die functional data receive path 144 to all of the first-die-to-second-die lanes 108. When the results of the comparison or other analysis indicate there are more than the threshold number of erroneously received bits, the routing circuitry/logic 140 may be configured to couple the second-die functional data receive path 144 to only the sub-group of the first-die-to-second-die lanes 108.

In the test mode, the control and self-test circuitry/logic 142 may also be configured to form link test result information that indicates the group of first-die-to-second-die lanes 108 (i.e., the group that has been determined to be good to use). The link test result information may indicate that the group consists of all of the first-die-to-second-die lanes 108 or, alternatively, may indicate that the group consists of only a sub-group of the first-die-to-second-die lanes 108 (i.e., fewer than all of the first-die-to-second-die lanes 108). In the test mode, the control and self-test circuitry/logic 142 may further be configured to initiate transmission of the link test result information to the first die 102 over the second-die-to-first-die lanes 110.

In the test mode, the control and self-test circuitry/logic 126 of the first die 102 may be configured to provide control signals to the routing circuitry/logic 124 based on the link test result information received from the second die 104. When the link test result information indicates there are no more than a threshold number of erroneously received bits, the routing circuitry/logic 124 may be configured to couple the first-die functional data transmit path 146 to all of the first-die-to-second-die lanes 108. When the link test result information indicates there are more than the threshold number of erroneously received bits, the routing circuitry/logic 124 may be configured to couple the first-die functional data receive path 146 to only the sub-group of the first-die-to-second-die lanes 106.

As a result of the above-described operations in the test mode, the first-die functional data transmit path 146 of the first die 102 may be coupled to only those first-die-to-second-die lanes 108 that are determined not to be associated with more than the threshold number of bit errors. Likewise as a result of the above-described operations in the test mode, the second-die functional data receive path 144 may be coupled to only those same first-die-to-second-die lanes 108 that are determined not to be associated with more than the threshold number of bit errors.

The same operations as described above may be performed in the test mode with regard to the second-die-to-first-die lanes 110. Although not described in similar detail here, it may be appreciated that the second-die functional data transmit path 148 may be coupled to only those second-die-to-first-die lanes 110 that are determined not to be associated with more than the threshold number of bit errors. Similarly as a result of these operations in the test mode, the first-die functional data receive path 150 may be coupled to only those same second-die-to-first-die lanes 110 that are determined not to be associated with more than the threshold number of bit errors.

Exiting the test mode may return the PHYs 114 and 130 to a mode that may be referred to as the functional mode or mission mode. In the functional mode, functional data may be transmitted from the first die 102 to the second die 104 over the group of the first-die-to-second-die lanes 108 that was configured during the test mode. Similarly, in the functional mode functional data may be transmitted from the second die 104 to the first die 102 over the group of the second-die-to-first-die lanes 110 that was configured during the test mode.

Figure 2:
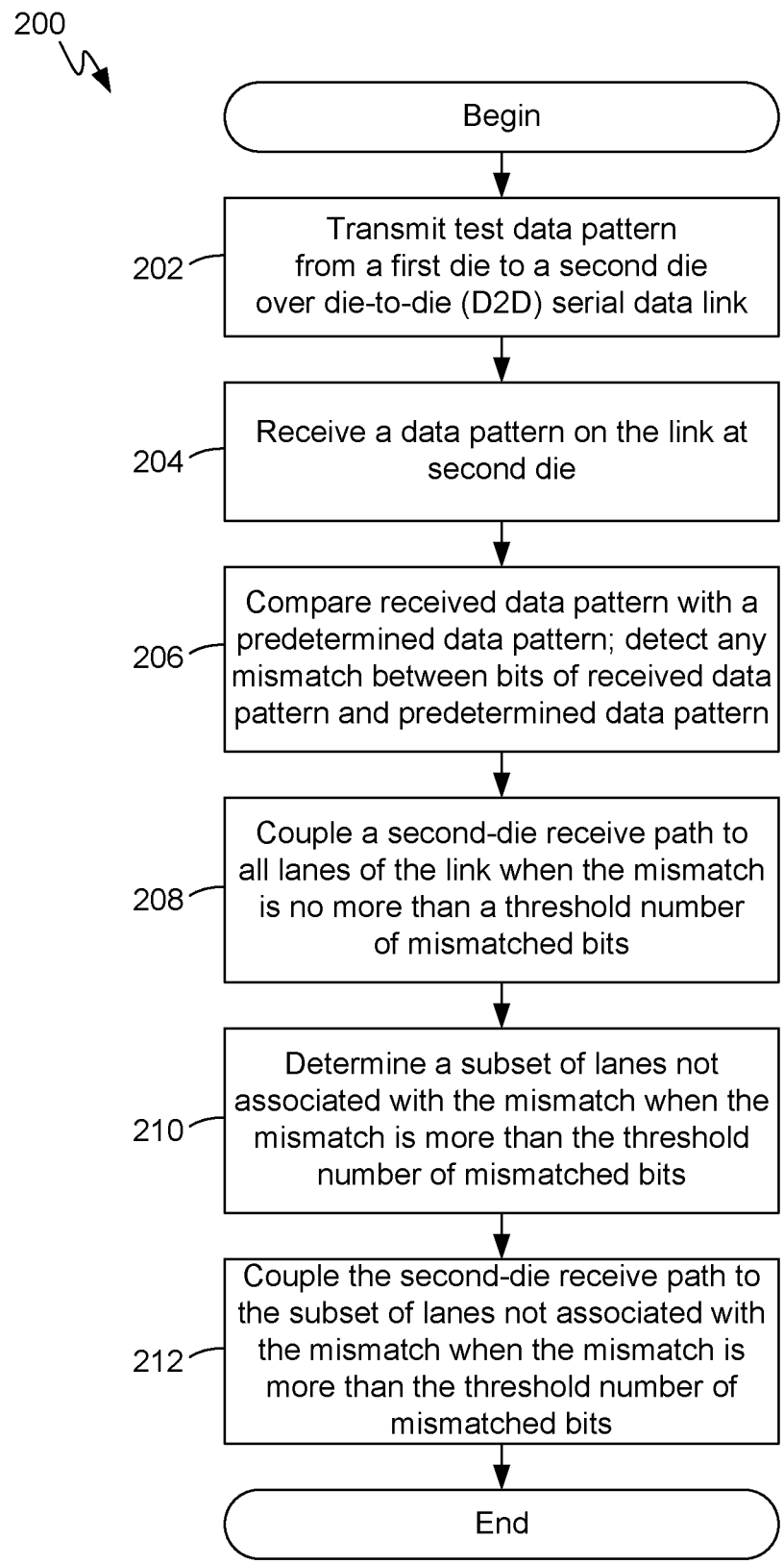
FIG. 2 is a flow diagram illustrating a method for dynamically configuring a die-to-die serial data link, in accordance with exemplary embodiments.

In FIG. 2, a method 200 for configuring a D2D serial data link is illustrated in flow diagram format. Although not shown in FIG. 2, the above-described test mode may be entered before the method 200 is performed and exited after the method 200 is completed. Entry into the test mode (and subsequent exit from the test mode after completing the test mode operations) may occur, for example, during booting of the device 100 (FIG. 1). The device 100 may then begin functional-mode or mission-mode operation in a configuration in which, as described above, lanes that may have been determined to be associated with bit errors are excluded. Alternatively, the test mode may be entered based on detection of errors during functional-mode operations. For example, one of the ECC checkers/correctors 118 and 134 may issue an alert indicating that more than a threshold number of bit errors in received functional data were detected during a time interval. An example of detection of more than a threshold number of bit errors in received functional data during a time interval may be detection of a double-bit error (i.e., two bit errors) on any one of the lanes. Using SECDED, the ECC checkers/correctors 118 and 134 are incapable of correcting double-bit errors. Nevertheless, reconfiguring the link 106 to use fewer than all lanes may save the device 100 from having to shut down the link 106 and, for example, enter a fail-safe mode or stop operating altogether. In an automotive control system, a total shutdown of the link 106 may mean, for example, that the automobile becomes inoperable. Another example of detection of more than a threshold number of bit errors in received functional data during a time interval may be detection of more than a threshold number of single-bit errors per minute on any one of the lanes. Using SECDED, the ECC checkers/correctors 118 and 134 may be capable of correcting single-bit errors, but an increase in the number of single-bit errors per minute may indicate a more severe failure is imminent. Therefore, in response to such an alert, the D2D controllers 112 and 128 may interrupt the communication of functional data and place the PHYs 114 and 130 in the test mode. After completing the test mode operations (e.g., the method 200 in FIG. 2) and exiting from the test mode, the device 100 may reboot in a configuration in which lanes associated with bit errors (e.g., more severe errors, such as double-bit errors) are excluded. The link 106 may then continue to operate with fewer than all lanes but at a reduced data rate. In an automotive control system, operation of the link 106 at a reduced data rate may, for example, enable the automobile to continue operating but in a fail-safe mode in which safeguards are imposed, such as, for example, a limit on the vehicle's speed. In addition or alternatively to continuing operation in a fail-safe mode, an alert may be issued (e.g., to the driver, a remote service, etc.), warning of an abnormal or potentially unsafe operating condition.

Referring again to FIG. 2, in the test mode, a test data pattern may be transmitted from a first die to a second die over lanes of a D2D serial data link, as indicated by block 202. Correspondingly, a data pattern may be received on the link at the second die, as indicated by block 204.

Then, as indicated by block 206, the received data pattern may be compared with a predetermined data pattern (e.g., the test data pattern). Note that if all of the lanes are operating correctly, the result of the comparison will indicate that the received data pattern matches the transmitted data pattern. That is, if all lanes are operating correctly the data bit value received on each of the lanes will match the data bit value that was correspondingly transmitted on that one of the lanes. However, if one or more lanes are not operating correctly, one or more bits of the received data pattern may not match those corresponding bits of the transmitted data pattern. There is a threshold number of mismatched bits above which the link may not operate correctly. In an example in which error checking/correcting logic is capable of detecting up to a double-bit error and correcting up to a single-bit error, i.e., SECDED, the threshold is one bit. Nevertheless, in other examples the threshold number of mismatched bits may be a number other than one. In an example in which the system lacks any error correcting capability, the threshold number of mismatched bits above which the link may not operate correctly may be zero.

As indicated by block 208, when there are no more than the threshold number of mismatched bits, the second-die functional data receive path may be configured to use all lanes of the link. However, when there are more than the threshold number of mismatched bits, a sub-group of the lanes, consisting of lanes that are not associated with any mismatched bits, may be determined, as indicated by block 210. The second-die functional data receive path may then be configured to use only the sub-group of lanes, as indicated by block 212.

Although not shown in FIG. 2 for purposes of clarity, the method 200 may be performed a first time to test and configure first-die-to-second-die lanes of the D2D serial data link and then performed a second time to test and configure second-die-to-first-die lanes of the D2D serial data link. The actions (as indicated by blocks 202-212) that are controlled or performed by components of the first die and components of the second die in testing and configuring the first-die-to-second-die lanes may be controlled or performed by corresponding components of the second die and components of the first die, respectively, in testing and configuring the second-die-to-first-die lanes.

Figure 3:
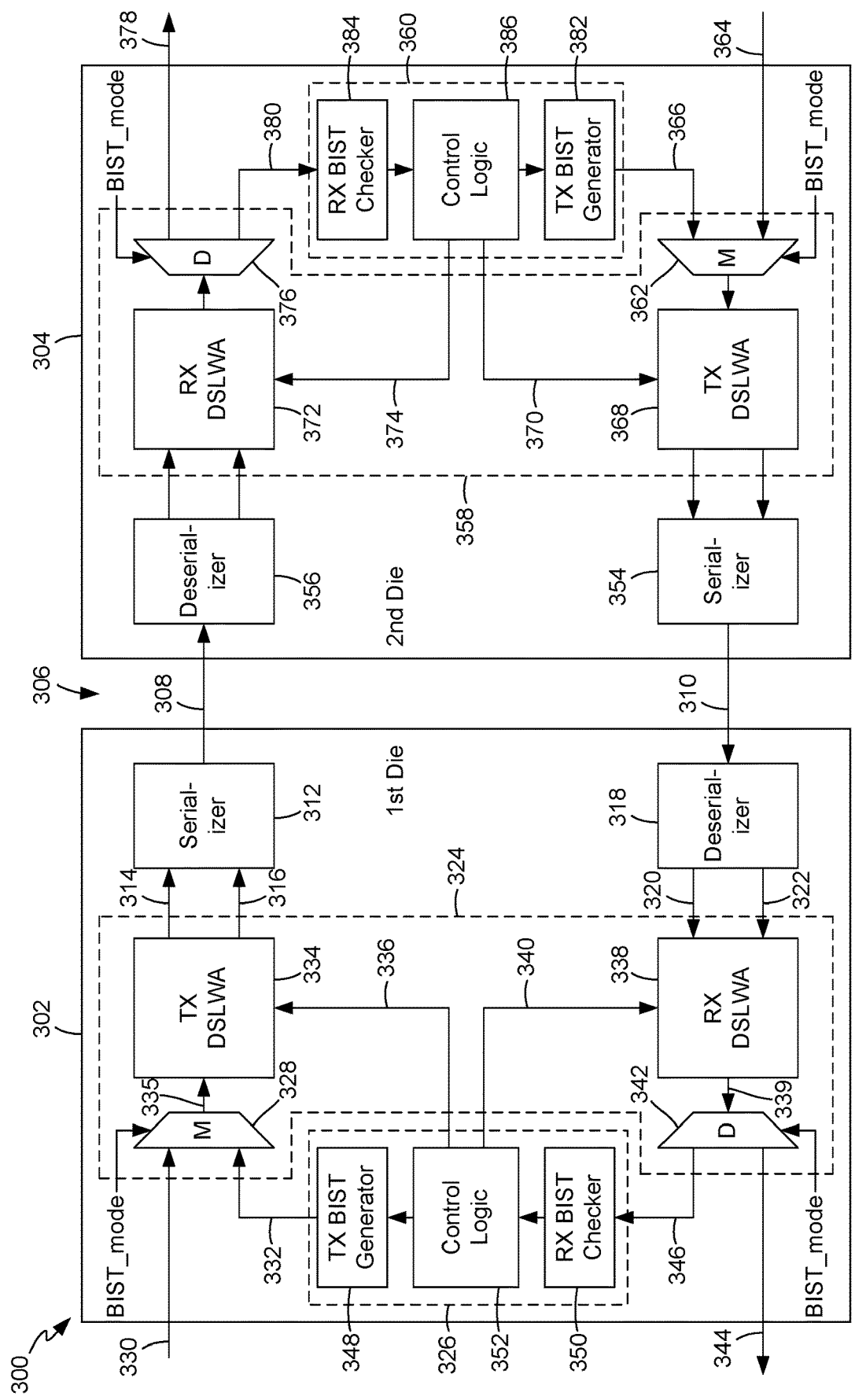
FIG. 3 is a block diagram of another system for dynamically configuring a die-to-die serial data link, in accordance with exemplary embodiments.
Figure 4A:
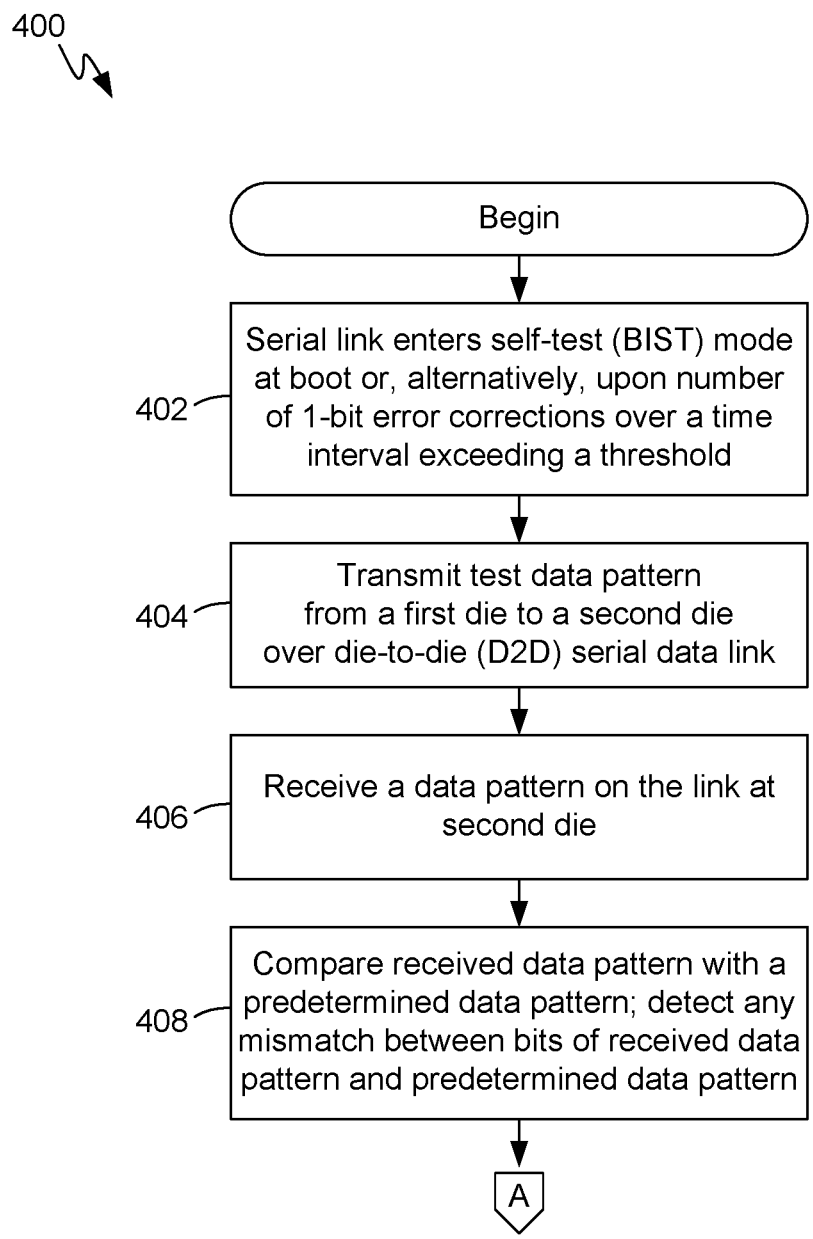
FIG. 4A is a flow diagram illustrating another method for dynamically configuring a die-to-die serial data link, in accordance with exemplary embodiments.
Figure 4B:
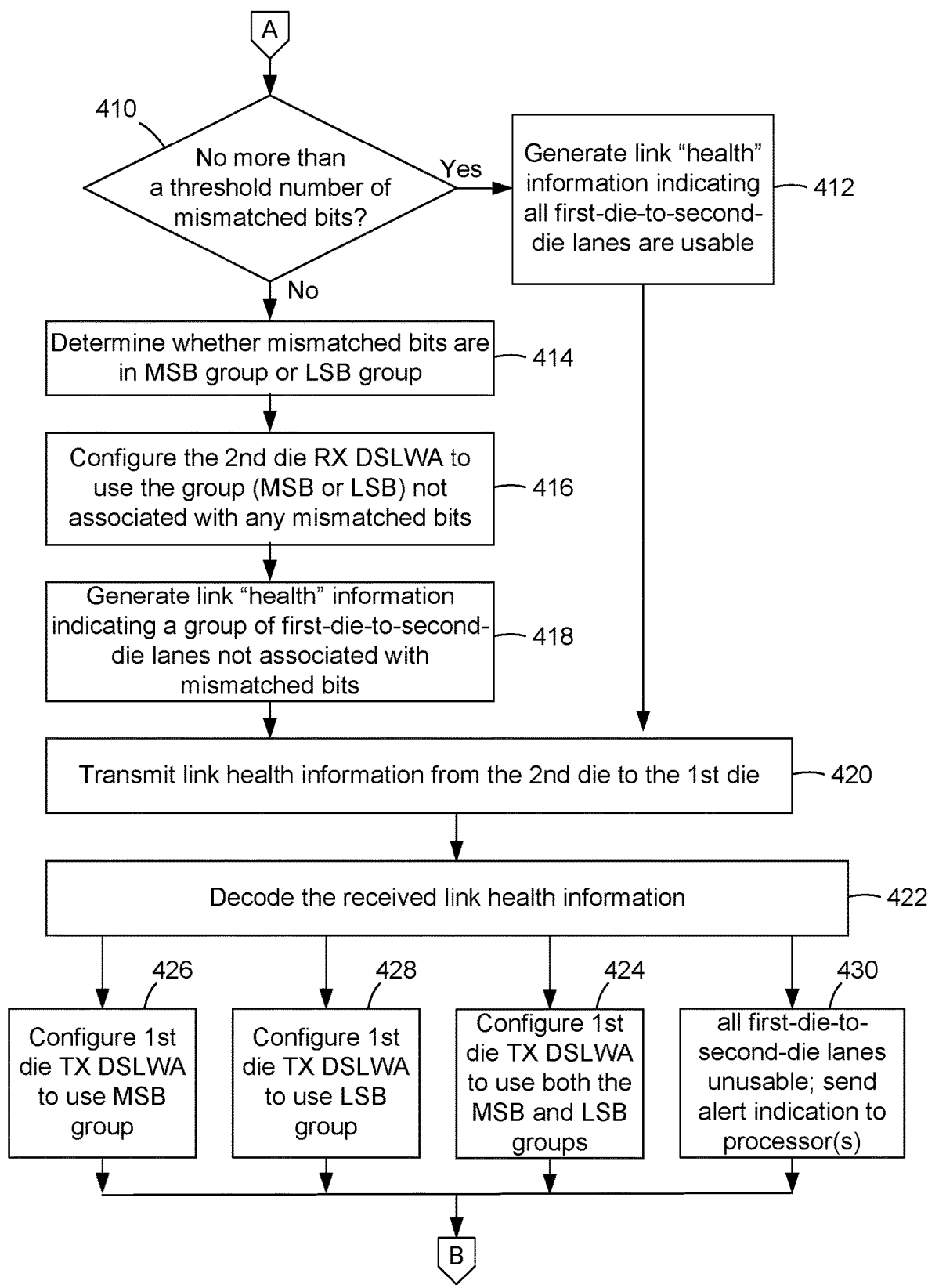
FIG. 4B is a continuation of the flow diagram of FIG. 4A.
Figure 4C:
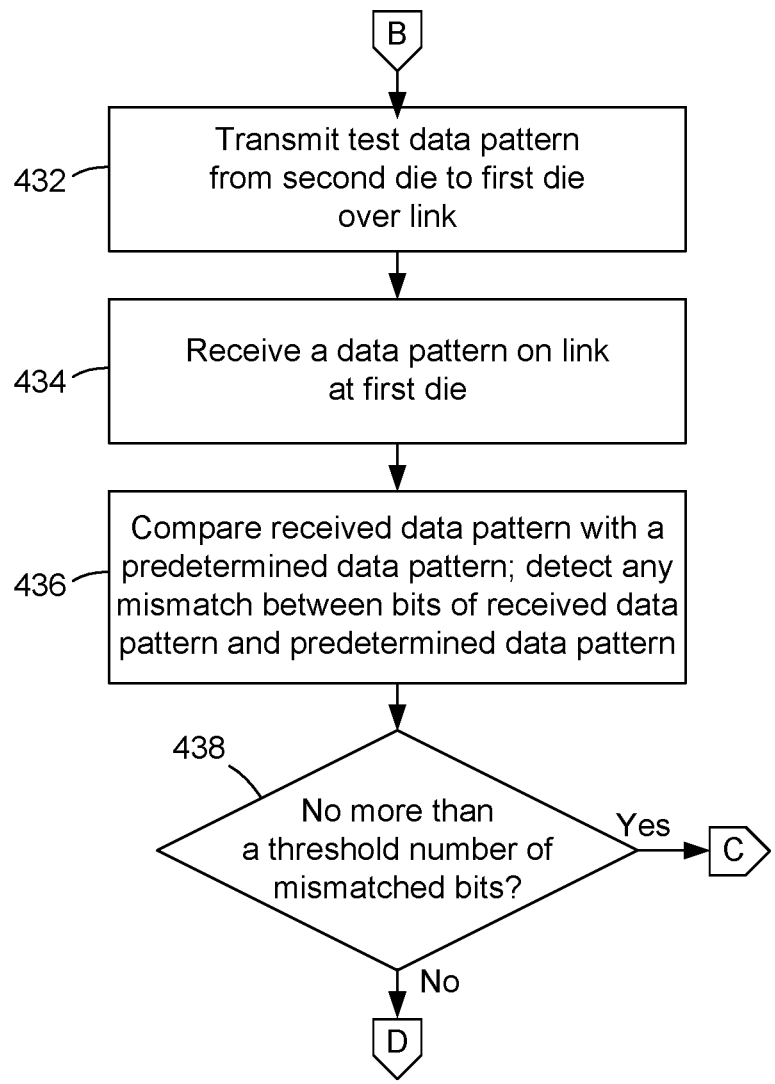
FIG. 4C is a continuation of the flow diagram of FIGS. 4A-4B.
Figure 4D:
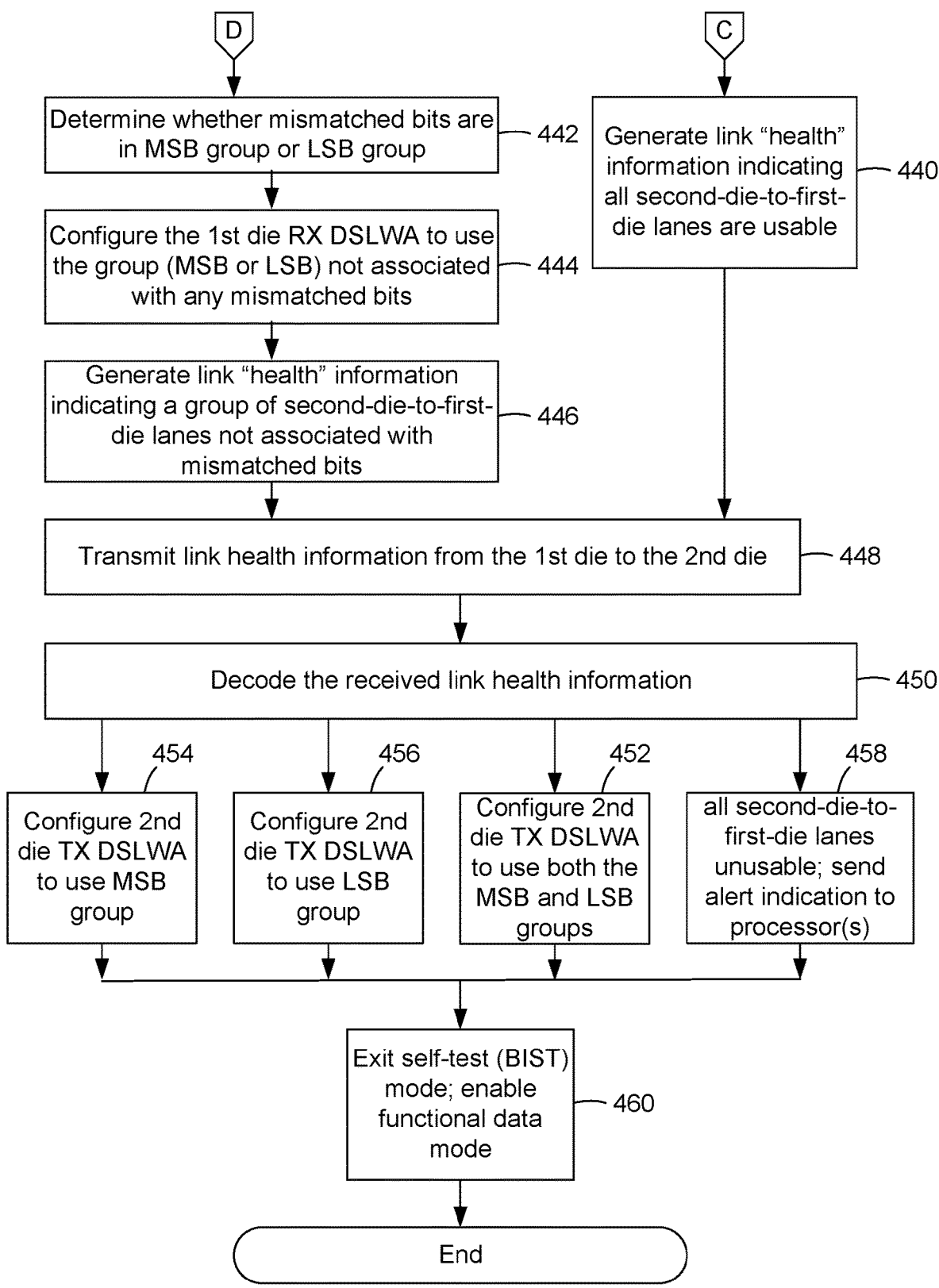
FIG. 4D is a continuation of the flow diagram of FIGS. 4A-4C.

In FIG. 3, a system 300 is illustrated in block diagram form. The system 300 may include a first die 302 and a second die 304. The system 300 may be an example of a portion of the device 100 described above with regard to FIG. 1. Accordingly, the first and second dies 302 and 304 may be examples of the above-described first and second dies 102 and 104 (FIG. 1), respectively. The first and second dies 302 and 304 may be configured to communicate data over a D2D serial data link 306, comprising first-die-to-second-die lanes 308 and second-die-to-first-die lanes 310. There may be any number of first-die-to-second-die lanes 308 and any number of second-die-to-first-die lanes 310, but the lanes are not individually shown in FIG. 3 for purposes of clarity. In an example, there may be 16 first-die-to-second-die lanes 308 and 16 second-die-to-first-die lanes 310. That is, the first die 302 may transmit (and the second die 304 may receive) 16 bits of data at a time, each bit transmitted on a corresponding one of the first-die-to-second-die lanes 308. Likewise, the second die 304 may transmit (and the first die 302 may receive) 16 bits of data at a time, each bit transmitted on a corresponding one of the second-die-to-first-die lanes 310.

The first die 302 may include a serializer 312. Depending on a dynamic configuration or state in which the system 300 is configured to operate (as described below), the serializer 312 may be configured to receive a 256-bit input data word on one or both of two paths: a most-significant bit ("MSB") path 314, and a least-significant bit ("LSB") path 316. A reference herein to the "MSB portion" of a data word refers to the upper half or most-significant half of the data word, and a reference to the "LSB portion" of the input data word refers to the lower half or least-significant half of the data word. In one configuration or state of operation of the system 300, the serializer 312 may receive the MSB portion of the data word on the MSB path 314 and receive the LSB portion of the data word on the LSB path 316. In another configuration or state of operation of the system 300, the serializer 312 may receive both the MSB portion and the LSB portion of the data word in a time-multiplexed fashion on the MSB path 314. In still another configuration or state of operation, the serializer 312 may receive both the MSB portion and the LSB portion of the data word in a time-multiplexed fashion on the LSB path 316.

The terms MSB and LSB are also used herein to refer to corresponding groups of the first-die-to-second-die lanes 308 and the second-die-to-first-die-lanes 310. That is, a reference to "MSB lanes," an "MSB group," an "MSB sub-group," etc., of the first-die-to-second-die lanes 308 or the second-die-to-first-die-lanes 310 refers to the upper half or most-significant half of the referenced lanes, and a reference to "LSB lanes," an "LSB group," an "LSB sub-group," etc., of the first-die-to-second-die lanes 308 or the second-die-to-first-die-lanes 310 refers to the lower half or least-significant half of the referenced lanes.

An example in which each data word is 256 bits, each data word is operated upon in two portions (a 128-bit MSB portion and a 128-bit LSB portion), the first-die-to-second-die lanes 308 are grouped into an 8-lane MSB group and an 8-lane LSB group, and the second-die-to-first-die lanes 310 are grouped into an 8-lane MSB group and an 8-lane LSB group, is used throughout the following description of the system 300. Nevertheless, it should be understood that in other examples a data word may consist of other numbers of bits, be operated upon by components in other bit groupings, etc. Although in this example there are 16 first-die-to-second-die lanes 308 and 16 second-die-to-first-die lanes 310, in other examples there may be other numbers of such lanes.

The first die 302 may also include a deserializer 318, which may be configured in a complementary manner to the manner described above with regard to the serializer 312. Accordingly, the deserializer 318 may be configured to receive data from MSB and LSB groups of the 16 second-die-to-first-die lanes 310 on one or both of an MSB path 320 and an LSB path 322.

The first die 302 may further include routing circuitry/logic 324 and control and self-test circuitry/logic 326. The routing circuitry/logic 324 and control and self-test circuitry/logic 326 may be examples of the routing circuitry/logic 124 and control and self-test circuitry/logic 126, respectively, described above with regard to FIG. 1.

The term "circuitry/logic" as used herein refers to electronic circuitry (i.e., hardware), which may include such elements as discrete logic gates, flip-flops, registers, finite state machines, memory elements, processors, etc., or combinations thereof. In some examples, circuitry/logic may be configured in part by operation of firmware or software. For convenience, such circuitry/logic may be referred to as circuitry or, alternatively, as logic.

The routing circuitry/logic 324 may include multiplexing circuitry/logic 328 configured to select between a functional data input path 330 and a test data input path 332. The multiplexing circuitry/logic 328 may select one of these inputs in response to a mode selection signal (Built-In Self-Test mode or "BIST_mode"), which may be provided by the control and self-test circuitry/logic 326 (signal connection not shown for purposes of clarity) or, alternatively, by D2D link controller circuitry/logic (not shown in FIG. 3). The mode selection signal may indicate either the test mode or the functional data mode. When the mode selection signal indicates the test mode, the multiplexing circuitry/logic 328 is configured to receive test data provided by the self-test circuitry/logic 326 on the test data input path 332. When the mode selection signal indicates the functional data mode, the multiplexing circuitry/logic 328 is configured to receive functional data provided by a D2D controller or other data source (not shown in FIG. 3) on the functional data input path 330. The test data and functional data each may have a width of, for example, 256 bits. That is, test data and functional data may each be provided in the form of 256-bit data words in this example.

The routing circuitry/logic 324 may also include circuitry/logic that may be referred to as a Transmit-path ("TX") Dynamic Serial Lane Width Adapter ("DSLWA") 334. The output of the multiplexing circuitry/logic 328, i.e., a TX data path 335, may be coupled to a TX data path input of the TX DSLWA 334. In the present example, in which data are provided in the form of 256-bit data words, the TX data path input of the TX DSLWA 334 may be 256 bits in width. Although not individually shown in FIG. 3 for purposes of clarity, the TX data path 335 may comprise a 128-bit TX path MSB portion and a 128-bit TX data path LSB portion. An example of the structure and operation of the TX DSLWA 334 is described below. Nevertheless, it may be appreciated here that the TX DSLWA 334 may be configurable, in response to control signals 336 provided by the control and self-test circuitry/logic 326, to multiplex or otherwise direct the MSB and LSB portions of an input data word to one or both of the above-described MSB and LSB paths 314 and 316 coupled to corresponding inputs of the serializer 312.

The routing circuitry/logic 324 may also include an RX DSLWA 338. The RX DSLWA 338 may be configured to receive the parallel-format data word from the deserializer 318. An example of the structure and operation of the RX DSLWA 338 is described below. Nevertheless, it may be appreciated here that the RX DSLWA 338 may be configurable, in response to control signals 340 provided by the control and self-test circuitry/logic 326, to demultiplex or otherwise obtain the data word from either the MSB path 320, the LSB path 322, or both the MSB path 320 and the LSB path 322 in combination. The output of the RX DSLWA 338, i.e., an RX data path 339, may be provided to the data input of demultiplexing circuitry/logic 342. In the present example, in which data are provided in the form of 256-bit data words, the RX data path 339 may be 256 bits in width. Although not individually shown in FIG. 3 for purposes of clarity, the RX data path 339 may comprise a 128-bit RX data path MSB portion and a 128-bit RX data path LSB portion.

The demultiplexing circuitry/logic 342 may be configured to direct the data words to either a functional data output path 344 or a test result information output path 346. The demultiplexing circuitry/logic 342 may select one of these outputs in response to the above-referenced mode selection signal. When the mode selection signal indicates the test mode, the demultiplexing circuitry/logic 342 is configured to direct received link test result information to the test result information output path 346. When the mode selection signal indicates the functional data mode, the demultiplexing circuitry/logic 342 is configured to direct received functional data to the functional data output path 344. The functional data output path 344 may provide the received functional data to a D2D controller or other data destination (not shown in FIG. 3).

The control and self-test circuitry/logic 326 may include TX BIST generator circuitry/logic 348, RX BIST checker circuitry/logic 350, and control circuitry/logic 352. As described below, in the test mode the TX BIST generator circuitry/logic 348 may be configured to generate test data patterns and provide this test data on the test data input path 332. An example of a test method is described below. Nevertheless, it may be appreciated here that in the test mode the test data is transmitted to the second die 304 over the first-die-to-second-die lanes 308. The second die 304 may use the received test data to generate link test result information, which the second die 304 may send back to the first die 302 over the second-die-to-first-die lanes 310.

The second die 304 may include components or elements that are similar to, and thus correspond to, the above-described components or elements of the first die 302: a serializer 354 similar to the above-described serializer 312; a deserializer 356 similar to the above-described deserializer 318; routing circuitry/logic 358 similar to the above-described routing circuitry/logic 324; control and self-test circuitry/logic 360 similar to the above-described control and self-test circuitry/logic 326; multiplexing circuitry/logic 362 similar to the above-described multiplexing circuitry/logic 328; a functional data input path 364 similar to the above-described functional data input path 330; a test data input path 366 similar to the above-described test data input path 332; a TX DSLWA 368 similar to the above-described TX DSLWA 334; control signals 370 for the TX DSLWA 368 similar to the above-described control signals 336; an RX DSLWA 372 similar to the above-described RX DSLWA 338; control signals 374 for the RX DSLWA 372 similar to the above-described control signals 340; demultiplexing circuitry/logic 376 similar to the above-described demultiplexing circuitry/logic 342; a functional data output path 378 similar to the above-described functional data output path 344; a link test result information output path 380 similar to the above-described link test result information output path 346; TX BIST generator circuitry/logic 382 similar to the above-described TX BIST generator circuitry/logic 348; RX BIST checker circuitry/logic 384 similar to the above-described RX BIST checker circuitry/logic 350; and control circuitry/logic 386 similar to the above-described control circuitry/logic 352. As the descriptions above of structures and functions of elements of the first die 302 apply to the corresponding elements of the second die 304, such descriptions are not repeated here with respect to the second die 304.

In FIGS. 4A-4D a method 400 is illustrated in flow diagram form. The method 400 may be an example of a method of operation of the system 300 described above with regard to FIG. 3.

As indicated by block 402, a self-test or BIST mode may be entered. Entry into the self-test mode may occur during booting of a device that includes the system 300 (FIG. 3). Alternatively, entry into the self-test mode may occur during an interval in which mission-mode-operation of such a device is interrupted. For example, detection of an increase in a bit error rate above a threshold (e.g., single-bit errors per time interval) may trigger entry into the self-test mode.

As indicated by block 404, a test data pattern may be transmitted from the first die 302 to the second die 304 over the first-die-to-second-die lanes 308 of the D2D serial data link 306. The control and self-test circuitry/logic 326 may transmit such a test data pattern. The test data pattern may be, for example, 256 bits in width before being serialized by the serializer 312. The test data pattern may be transmitted via various intermediary components, such as the multiplexing circuitry/logic 328, the TX DSLWA 334, the serializer 312, etc.

As indicated by block 406, a data pattern may be received at the second die 304 on the first-die-to-second-die lanes 308. As indicated by block 408, the received data pattern may be compared with a predetermined data pattern, and any mismatch between bits of the received data pattern and bits of the predetermined data pattern may be determined. The RX BIST checker circuitry/logic 384 may perform this comparison and determination of any mismatched bits. The result of this comparison may indicate that all bits (e.g., 256 bits) of the received data pattern match all corresponding bits (e.g., 256 bits) of the predetermined data pattern or that one or more bits of the received data pattern do not match the corresponding bits of the predetermined data pattern.

As indicated by block 410 (FIG. 4B), the number of mismatched bits may be compared with a threshold. The control circuitry/logic 386 may perform this comparison. The threshold may be, for example, the number of erroneous bits above which the ECC logic is incapable of correcting. For example, ECC logic employing SECDED cannot correct more than a single-bit error. Accordingly, the threshold may be one bit, and in accordance with block 410 it may be determined whether there are no more than one mismatched bit (i.e., either one mismatched bit or zero mismatched bits). If there are no more than the threshold number of mismatched bits, then the first-die-to-second-die lanes 308 may be referred to as "healthy," or have a "link health" status of "okay," etc.

As indicated by block 412, if there are no more than the threshold number of mismatched bits, then link health information may be generated that indicates all of the first-die-to-second-die lanes 308 of the link 306 are usable (or "healthy," "okay," etc.). The link health information may be an example of the link test result information described above. The link health information may have any form. For example, link health information produced in accordance with block 412 may be in the form of a binary indicator (e.g., a flag) indicating a health status of "healthy," "okay," "all-usable," etc. Alternatively, the link health information produced in accordance with block 412 may be in the form of a list of lanes, or other form. Regardless of the form of the link health information, link health information generated in accordance with block 412 may indicate that the group of usable lanes consists of all of the first-die-to-second-die lanes 308.

As indicated by block 414, if the number of mismatched bits exceeds the above-referenced threshold, then it may be determined whether those mismatched bits are in the MSB group or the LSB group of the compared data. In the examples described herein, the 16 first-die-to-second-die lanes 308 may be divided into two groups: an 8-lane MSB group, and an 8-lane LSB group. The eight data bits received over the MSB group of the first-die-to-second-die lanes 308 may be deserialized into a 128-bit parallel data word MSB portion. A mismatch detected in any of those 128 bit positions thus corresponds to an error on one of the eight lanes of the MSB group of first-die-to-second-die lanes 308. Likewise, the eight data bits received over the LSB group of the first-die-to-second-die lanes 308 may be deserialized into a 128-bit parallel data word LSB portion. A mismatch detected in any of those 128 bit positions thus corresponds to an error on one of the eight lanes of the LSB group of first-die-to-second-die lanes 308. In this manner, a bit mismatch may be isolated to either the MSB group of the first-die-to-second-die lanes 308 or the LSB group of the first-die-to-second-die lanes 308. As described below, the group of eight first-die-to-second-die lanes 308 associated with the mismatched bit may then be excluded from transmitting functional data, and only the remaining eight first-die-to-second-die lanes 308 may be used for transmitting functional data.

As indicated by block 416, the control circuitry/logic 386 may reconfigure the RX DSLWA 372 to use a bit group (i.e., MSB or LSB) that is not associated with mismatched bits. Examples of reconfiguring the RX DSLWA 372 are described below. Nevertheless, it may be appreciated here that as a result of this reconfiguring, the RX DSLWA 372 may demultiplex or select functional data from only the MSB group (and not from the LSB group) or only the LSB group (and not from the MSB group).

As indicated by block 418, the control circuitry/logic 386 may generate link health information. Like the link health information generated in accordance with block 412, the link health information generated in accordance with block 418 may indicate a group of lanes. However, this group may be a sub-group of all of the lanes. The indicated group of lanes may be the aforementioned MSB or LSB sub-group that is not associated with mismatched bits. Alternatively, the indicated group of lanes may be the sub-group that is associated with one or more mismatched bits (i.e., the complement of the sub-group that is not associated with mismatched bits), thereby implicitly indicating that the other (complementary) bit group is not associated with any mismatched bits. The link health information produced in accordance with block 418 may in the form of, for example, a flag indicating one of two groups of lanes, a list of lanes, a code (e.g., a number) identifying one of multiple predetermined groups of lanes, or other form. Regardless of the form of the link health information, the link health information generated in accordance with block 418 indicates a group of usable lanes that is a sub-group of all first-die-to-second-die lanes 308.

As indicated by block 420, the link health information (as determined in accordance with block 418 or 412) may then be transmitted to the first die 302 over the second-die-to-first-die lanes 310 of the D2D serial data link 306. The control circuitry/logic 386 may transmit the link health information. The link health information may be transmitted via various intermediary components, such as the TX BIST generator circuitry/logic 382, the multiplexing circuitry/logic 362, the TX DSLWA 368, the serializer 354, etc. As the health of the second-die-to-first-die lanes 310 has not yet been determined, multiple copies of the link health information may be transmitted.

As indicated by block 422, the link health information may be received at the first die 302. The multiple copies of the link health information may be compared with each other, and the most frequently received copy may be selected and decoded. That is, it may be determined whether the link health information indicates that the group of all first-die-to-second-die lanes 308 is usable, or that only a sub-group of the first-die-to-second-die lanes 308 is usable. The control circuitry/logic 352 and/or the RX BIST checker 350 may perform this decoding. In the exemplary embodiment (FIGS. 3-4A-D), the link health information may indicate one of four results: the group of all first-die-to-second-die lanes 308 is usable; the group of first-die-to-second-die lanes 308 consisting of only the MSB sub-group of lanes is usable; the group of first-die-to-second-die lanes 308 consisting of only the LSB sub-group of lanes is usable; or none of the first-die-to-second-die lanes 308 are usable (i.e., the group of usable lanes is null).

If it is determined that the link health information indicates all first-die-to-second-die lanes 308 are usable, then as indicated by block 424 the control circuitry/logic 352 may configure the TX DSLWA 334 to transmit the MSB portion of each data word on the MSB path 314 and to transmit the LSB portion of each data word on the LSB path 316. Note that this configuration may be a default or initial configuration. If the TX DSLWA 334 is already configured (e.g., as a result of an initialization before the method 400 is begun) to transmit the MSB portion of a data word on the MSB path 314 and the LSB portion of a data word on the LSB path 316, then no additional configuring need be performed at block 424.

If it is determined that the link health information indicates only the MSB sub-group of first-die-to-second-die lanes 308 is usable, then as indicated by block 426 the control circuitry/logic 352 may configure the TX DSLWA 334 to transmit both the MSB portion and the LSB portion of each data word on the MSB path 314 in a time-multiplexed manner described below. If it is determined that the link health information indicates only the LSB sub-group of first-die-to-second-die lanes 308 is usable, then as indicated by block 428 the control circuitry/logic 352 may configure the TX DSLWA 334 to transmit both the MSB portion and the LSB portion of each data word on the LSB path 316 in a time-multiplexed manner described below.

If it is determined that the link health information indicates neither the LSB sub-group nor the MSB sub-group of first-die-to-second-die lanes 308 is usable, then as indicated by block 430 the control circuitry/logic 352 may issue an alert signal (e.g., alert the D2D link processor or other processor). In an example in which the system 300 is included in an automotive control system, such an alert signal may be used, for example, to alert a driver of a potentially unsafe condition (e.g., that the vehicle or some aspect thereof is inoperable), or to trigger a transition of the vehicle into a fail-safe driving mode, etc.

Following the above-described testing of the first-die-to-second-die lanes 308 and any reconfiguring or other actions responsive to the test results, the same type of testing, reconfiguring, etc., may be performed with regard to the second-die-to-first-die lanes 310. The transmitting of a test data pattern from the second die 304 to the first die 302 over the second-die-to-first-die lanes 310 as indicated by block 432 (FIG. 4C) may be similar to the transmitting described above with regard to block 404, except that the TX BIST generator circuitry/logic 382 may transmit the test data pattern. The receiving of a test data pattern as indicated by block 434 may be similar to the receiving described above with regard to block 406, except that the RX BIST checker circuitry/logic 350 may receive the test data pattern. The comparing of the received data pattern with a predetermined data pattern as indicated by block 436 may be similar to the comparing described above with regard to block 408, except that the RX BIST checker circuitry/logic 350 may compare the data patterns. The comparing of the number of mismatched bits with a threshold as indicated by block 438 may be similar to the comparing described above with regard to block 410, except that the control circuitry/logic 352 may perform this comparing. The generating of link health information as indicated by block 440 (FIG. 4D) may be similar to the generating of link health information described above with regard to block 412, except that the control circuitry/logic 352 may generate the link health information. The determining of whether mismatched bits are in the MSB group or the LSB group as indicated by block 442 (FIG. 4D) may be similar to the determining described above with regard to block 414, except that the control circuitry/logic 352 may make this determination. The configuring of the RX DLSWA 338 as indicated by block 444 may be similar to the configuring of the RX DSLWA 372 described above with regard to block 416. The control circuitry/logic 352 may configure the RX DSLWA 338. The generating of link health information as indicated by block 446 may be similar to the generating of link health information described above with regard to block 418, except that the control circuitry/logic 352 may generate the link health information. The transmitting of the link health information from the first die 302 to the second die 304 as indicated by block 448 may be similar to the transmitting of link health information from the second die 304 to the first die 302, except that the control circuitry/logic 352 may transmit the link health information over the first-die-to-second-die lanes 308.

The decoding of link health information received at the second die 304 as indicated by block 450 may be similar to the decoding of link health information received at the first die 302 as described above with regard to block 422, except that the control circuitry/logic 386 may decode the link health information. The configuring of the TX DSLWA 368 as indicated by blocks 452, 454 and 456 may be similar to the configuring of the TX DSLWA 334 as described above with regard to blocks 424, 426 and 428, respectively. The control circuitry/logic 386 may configure the TX DSLWA 368. The sending of an alert signal as indicated by block 458 may be similar to the sending of an alert signal described above with regard to block 430, except that the control circuitry/logic 386 may send the alert signal.

As indicated by block 460, the self-test mode may be exited following the above-described testing of the first-die-to-second-die lanes 308, second-die-to-first-die lanes 310, and any re-configuring or other actions responsive to the test results. Exiting the self-test mode may place the system 300 into the functional mode, in which functional data may be transmitted over the serial data link 306 or portions thereof. The following examples illustrate how functional data may be routed based upon how the DSLWAs are configured.

Figure 5:
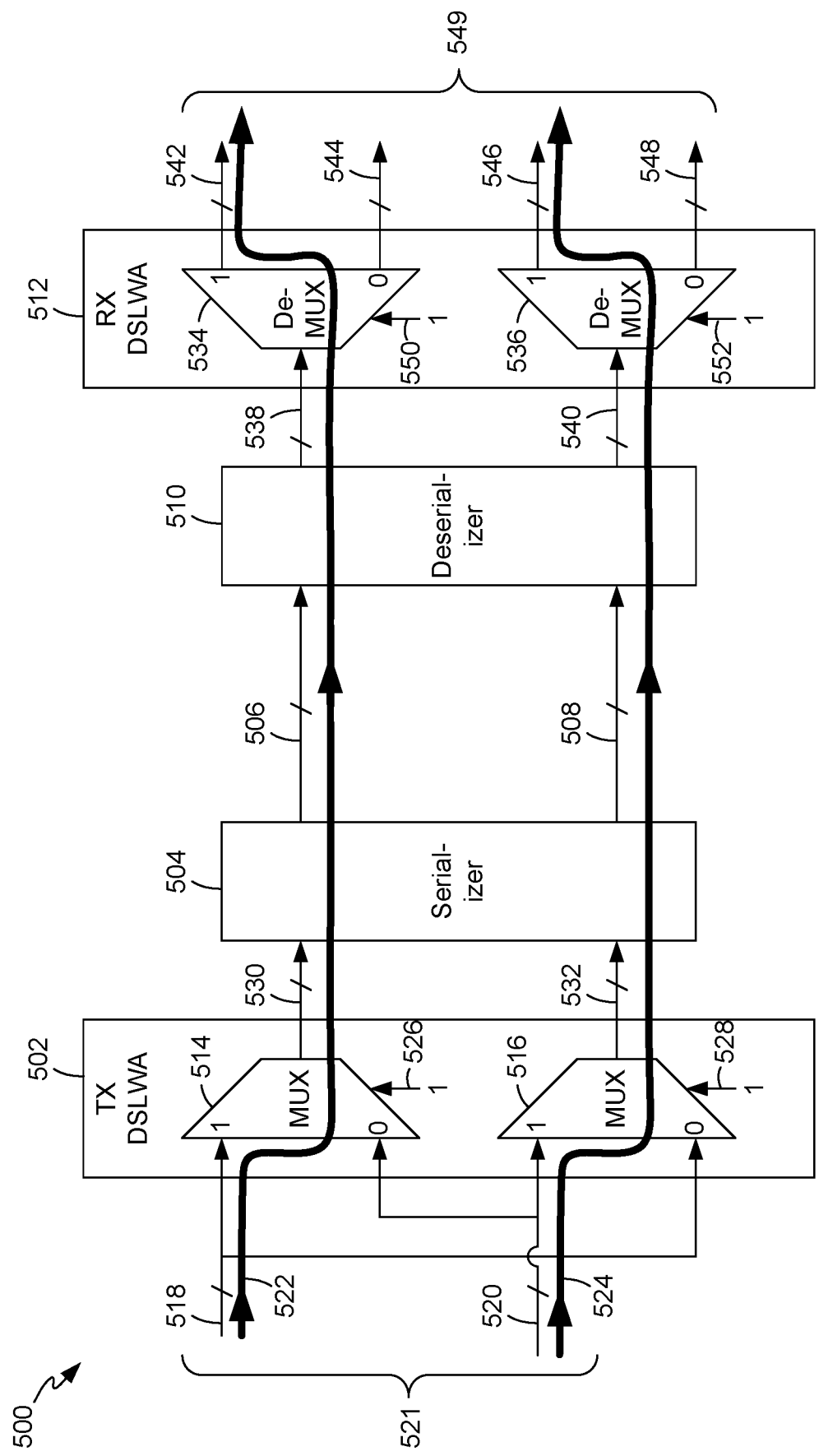
FIG. 5 is a block diagram illustrating a die-to-die serial data link configured to use all lanes, in accordance with exemplary embodiments.

In FIG. 5, a system 500 may include a TX DSLWA 502, a serializer 504, MSB lanes 506, LSB lanes 508, a deserializer 510, and an RX DSLWA 512. The TX DSLWA 502, serializer 504, MSB lanes 506, LSB lanes 508, deserializer 510, and RX DSLWA 512 may be examples of the above-described (FIG. 3) TX DSLWA 334, serializer 312, MSB and LSB lanes of the first-die-to-second-die lanes 308, deserializer 356, and RX DSLWA 372, respectively. Alternatively, the TX DSLWA 502, serializer 504, MSB lanes 506, LSB lanes 508, deserializer 510, and RX DSLWA 512 may be examples of the TX DSLWA 368, serializer 354, MSB and LSB lanes of the second-die-to-first-die lanes 310, deserializer 318, and RX DSLWA 338, respectively. There may be, for example, eight MSB lanes 506 and eight LSB lanes 508. The dies are not shown in FIG. 5 for purposes of clarity.

The TX DSLWA 502 may include a first multiplexer ("MUX") 514 and a second MUX 516. A first input of the first MUX 514 may be coupled to a TX data path MSB portion 518. A second input of the first MUX 514 may be coupled to a TX data path LSB portion 520. The TX data path MSB portion 518 and TX data path LSB portion 520 may together provide a first-die TX path 521. A first input of the second MUX 516 may be coupled to the TX data path LSB portion 520. A second input of the second MUX 516 may be coupled to the TX data path MSB portion 518. The TX data path MSB portion 518 and TX data path LSB portion 520 each may have a width of, for example, 128 bits and thus may together be configured to provide a 256-bit input data word to the system 500. The input data word may comprise a 128-bit MSB portion 522 and a 128-bit LSB portion 524.

The first MUX 514 and the second MUX 516 may have selector inputs 526 and 528, respectively, configured to receive control signals from, for example, the control circuitry/logic 352 or 386 described above with regard to FIG. 3. These control signals are associated with the configuration or state of operation of the system 500. The system 500 is shown in FIG. 5 in a configuration or state of operation in which, in response to these control signals, the first MUX 514 selects the MSB portion 522 of the data word to route to the serializer 504 via the TX MSB path 530, and the second MUX 516 selects the LSB portion 524 of the data word to route to the serializer 504 via the TX LSB path 532. The control signals may remain in the states shown in FIG. 5 for the duration of a functional data transmission.

The serializer 504 may be configured to serialize the MSB portion 522 of the data onto the MSB lanes 506. For example, the serializer 504 may convert a 128-bit MSB portion 522 into multiple 8-bit portions transmitted serially over the MSB lanes 506. Similarly, the serializer 504 may be configured to serialize the LSB portion 524 of the data onto the LSB lanes 508. For example, the serializer 504 may convert a 128-bit LSB portion 524 into multiple 8-bit portions transmitted serially over the LSB lanes 508.

The deserializer 510 may be configured to deserialize the MSB portion 522 of the data received on the MSB lanes 506. For example, the deserializer 510 may convert multiple 8-bit portions received serially over the MSB lanes 506 back into the 128-bit MSB portion 522. Similarly, the deserializer 510 may convert multiple 8-bit portions received serially over the LSB lanes 508 back into the 128-bit LSB portion 524.

The RX DSLWA 512 may include a first DEMUX 534 and a second DEMUX 536. The data input of the first DEMUX 534 may be coupled to an RX MSB path 538 that is an output of the deserializer 510. The data input of the second DEMUX 536 may be coupled to an RX LSB path 540 that is an output of the deserializer 510.

The first DEMUX 534 may be configurable to selectably couple the RX MSB path 538 to either an MSB portion 542 of a first RX output or an LSB portion 544 of the first RX output. The second DEMUX 536 may be configurable to selectably couple the RX LSB path 540 to either an LSB portion 546 of a second RX output or an MSB portion 548 of the second RX output. The MSB portion 542 of the first RX output, the LSB portion 544 of the first RX output, the LSB portion 546 of the second RX output, and the MSB portion 548 of the second RX output may together provide a second-die RX path 549.

The first DEMUX 534 and the second DEMUX 536 may have selector inputs 550 and 552, respectively, configured to receive control signals from, for example, the control circuitry/logic 352 or 386 described above with regard to FIG. 3. As noted above, these control signals are associated with the configuration or state of operation of the system 500. The system 500 is shown in FIG. 5 in a configuration or state of operation in which, in response to these control signals, the first DEMUX 534 couples the RX MSB path 538 to the MSB portion 542 of the first RX output, and the second DEMUX 536 couples the RX LSB path 540 to the LSB portion 546 of the second RX path. Accordingly, the MSB portion 522 of the data word is provided on the MSB portion 542 of the first RX output, while the LSB portion 524 of the data word is provided on the LSB portion 546 of the second RX output. In the illustrated configuration or state of operation of the system 500, the MSB portion 542 of the first RX output and the LSB portion 546 of the second RX output together provide the output data of the system 500. In the illustrated example, the 128 MSBs of the data word provided on the MSB portion 542 of the first RX output and the 128 LSBs of the data word provided on the LSB portion 546 of the second RX output together form the 256-bit output data word.

Note that in an example of operation of the system 500 in which all eight of the MSB lanes 506 and all eight of the LSB lanes 508 are operating correctly, the MSB portion 522 of the data word at the input of the system 500 will be identical to the MSB portion 522 of the data word at the output the system 500, and the LSB portion 524 of the data word that is the input of the system 500 will be identical to the LSB portion 524 of the data word that is the output of the system 500. Nevertheless, as described above, it is contemplated that under some conditions one or more of the MSB lanes 506 or one or more of the LSB lanes 508 may operate incorrectly, i.e., fail to transmit the correct bit value between dies.

Figure 6:
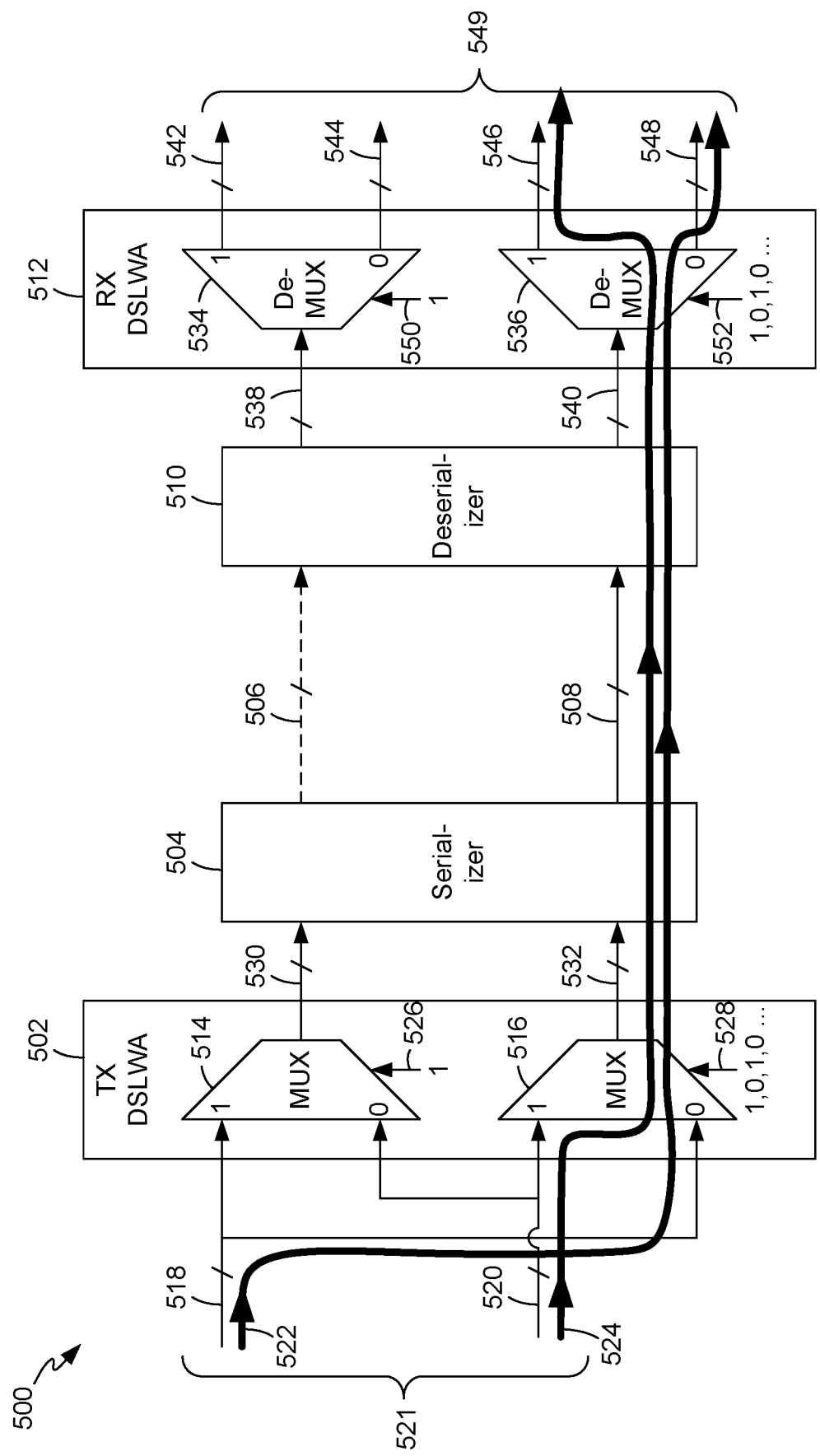
FIG. 6 is similar to FIG. 5, showing the die-to-die serial data link configured to use one half of the lanes, in accordance with exemplary embodiments.

In FIG. 6, the system 500 is shown in another configuration or state of operation. The configuration of the system 500 shown in FIG. 6 may be selected in response to detection of correct operation of the LSB lanes 508 but incorrect operation of the MSB lanes 506. As described above with regard to FIGS. 2, 3 and 4A-4D, comparing a received data word with a predetermined data pattern may reveal such incorrect operation. Note that the system 500 may operate in the state shown in FIG. 5 until such time as such erroneous or incorrect operation is detected, and then the system 500 may be reconfigured to operate in the state shown in FIG. 6 (or alternatively, as described below, the state shown in FIG. 7). In response to the MUX control signals, the second MUX 516 may be reconfigured to multiplex both the MSB portion 522 of the data word and the LSB portion 524 of the data word onto the TX LSB path 532. Such multiplexing (or time-multiplexing) may be controlled by MUX control signals alternating between "1" and "0" values (i.e., a pattern "1,0,1,0 . . . ") for the duration of the functional data transmission. In response, the second MUX 516 alternately selects the TX data path MSB portion 518 and the TX data path LSB portion 520. The first MUX 514 is not used in the configuration or state of operation shown in FIG. 6.

The serializer 504 alternately receives the MSB portion 522 of the data word and the LSB portion 524 of the data word via the TX LSB path 532. The output of the serializer (i.e., the alternating serialized MSB portion 522 and LSB portion 524) may be transmitted over the LSB lanes 508. The MSB lanes 506 are not used in the configuration of state of operation shown in FIG. 6. The deserializer 510 may be configured to deserialize the MSB portion 522 and LSB portion 524 of the data received on the LSB lanes 508.

In the configuration or state of operation shown in FIG. 6, the second DEMUX 536 may demultiplex both the MSB portion 522 of the data word and the LSB portion 524 of the data word from the RX data path LSB portion 540. Such demultiplexing may be controlled by the DEMUX control signals alternating between "1" and "0" values (i.e., a pattern "1,0,1,0 . . . ") for the duration of the functional data transmission. In response, the second DEMUX 536 alternately couples the RX LSB path 540 to the LSB portion 546 of the second RX output and the MSB portion 548 of the second RX output. The first DEMUX 534 is not used in the configuration or state of operation shown in FIG. 6.

Accordingly, the MSB portion 522 of the data word is provided on the MSB portion 548 of the second RX output, while the LSB portion 524 of the data word is provided on the LSB portion 546 of the second RX output. The MSB portion 548 of the second RX output and the LSB portion 546 of the second RX output together provide the output data of the system 500. In the illustrated example, the 128 MSBs of the data word provided on the MSB portion 548 of the second RX output and the 128 LSBs of the data word provided on the LSB portion 546 of the second RX output together form the 256-bit output data word.

Figure 7:
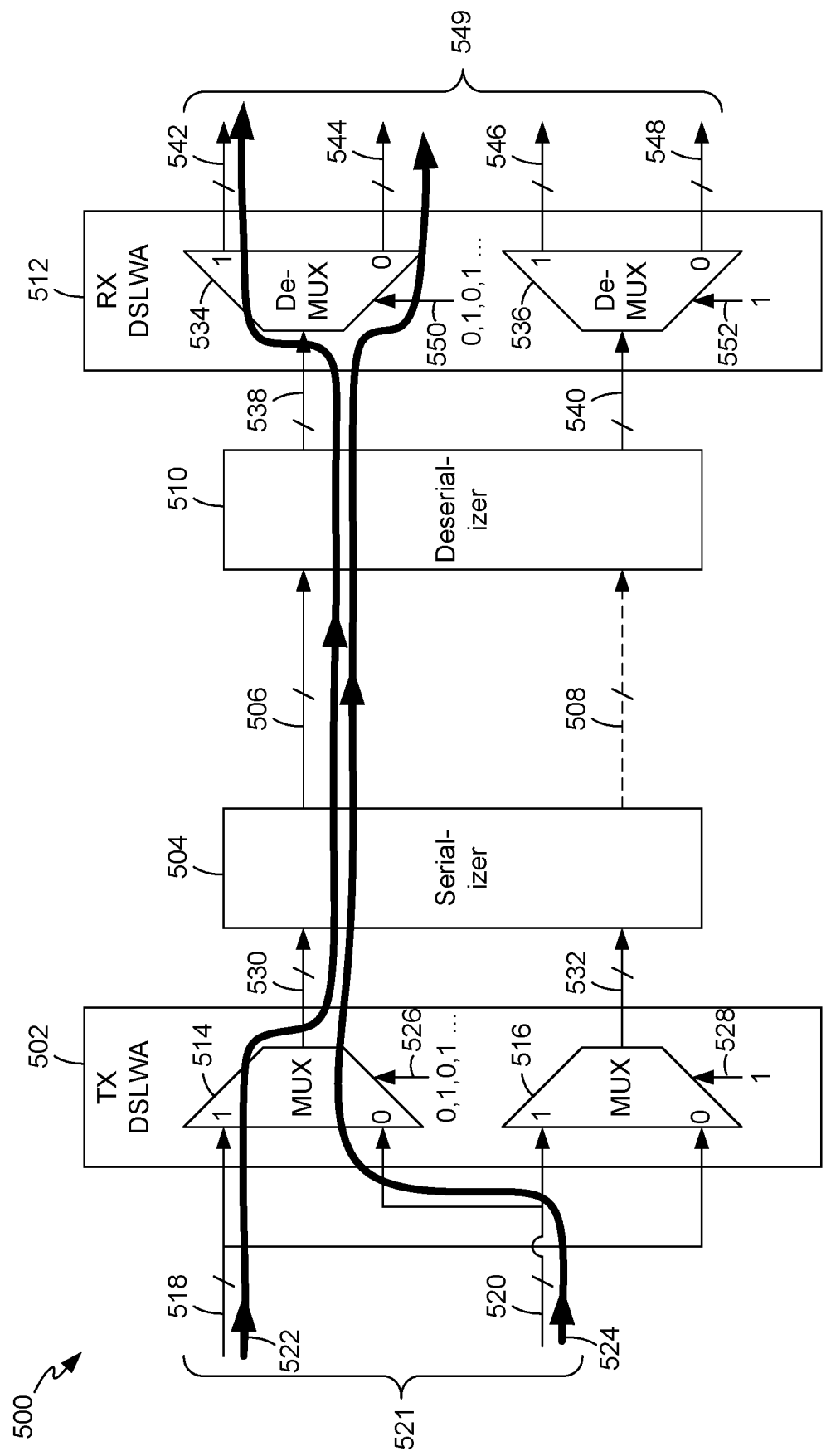
FIG. 7 is similar to FIG. 6, showing the die-to-die serial data link configured to use the other half of the lanes, in accordance with exemplary embodiments.

In FIG. 7, the system 500 is shown in another configuration or state of operation. The configuration of the system 500 shown in FIG. 7 may be selected in response to detection of correct operation of the MSB lanes 506 but incorrect operation of the LSB lanes 508. In response to the MUX control signals, the first MUX 514 may be configured (or reconfigured) to multiplex both the MSB portion 522 of the data word and the LSB portion 524 of the data word onto the TX MSB path 530. Such multiplexing may be controlled by MUX control signals alternating between "0" and "1" values (i.e., a pattern "0,1,0,1 . . . ") for the duration of the functional data transmission. In response, the first MUX 514 alternately selects the TX data path MSB portion 518 and the TX data path LSB portion 520. The second MUX 516 is not used in the configuration or state of operation shown in FIG. 7.

The serializer 504 alternately receives the MSB portion 522 of the data word and the LSB portion 524 of the data word via the TX MSB path 530. The output of the serializer (i.e., the alternating serialized MSB portion 522 and LSB portion 524) may be transmitted over the MSB lanes 506. The LSB lanes 508 are not used in the configuration of state of operation shown in FIG. 7. The deserializer 510 may be configured to deserialize the MSB portion 522 and LSB portion 524 of the data received on the MSB lanes 506.

In the configuration or state of operation shown in FIG. 7, the first DEMUX 534 may demultiplex both the MSB portion 522 of the data word and the LSB portion 524 of the data word from the RX MSB path 538. Such demultiplexing may be controlled by the DEMUX control signals alternating between "0" and "1" values (i.e., a pattern "0,1,0,1 . . . ") for the duration of the functional data transmission. In response, the first DEMUX 534 alternately couples the RX MSB path 538 to the MSB portion 542 of the first RX output and the LSB portion 544 of the first RX output. The second DEMUX 536 is not used in the configuration or state of operation shown in FIG. 7.

Accordingly, the MSB portion 522 of the data word is provided on the MSB portion 542 of the first RX output, while the LSB portion 524 of the data word is provided on the LSB portion 544 of the first RX output. The MSB portion 542 of the first RX output and the LSB portion 544 of the first RX output together provide the output data of the system 500. In the illustrated example, the 128 MSBs of the data word provided on the MSB portion 542 of the first RX output and the 128 LSBs of the data word provided on the LSB portion 544 of the first RX output together form the 256-bit output data word.

Note that in the configuration of the system 500 shown in FIG. 5, i.e., when the TX data path on a die is coupled to all of the lanes, functional data may be transmitted over those lanes at a data rate that may be referred to as a full data rate. That is, utilizing all of the lanes, the full data rate can be achieved. In contrast, in the configuration of the system 500 shown in FIG. 6 or 7, i.e., when the TX data path on a die is coupled to only half of the lanes, functional data may be transmitted over those lanes at a reduced data rate of one-half the full data rate.

In the system 500, there may, for example, a total of 16 lanes comprising (i.e., divided into) two groups or sub-groups: a first sub-group of eight MSB lanes, and a second sub-group of eight LSB lanes. Nevertheless, in other embodiments (not shown) the total number of lanes could be divided into more than two sub-groups. For example, 16 lanes could be divided into four sub-groups: a first sub-group of four lanes, a second sub-group of four lanes, a third sub-group of four lanes, and a fourth sub-group of four lanes. More generally, the total number of lanes may be divided into any number (N) of predetermined sub-groups of the lanes. Each of the sub-groups may consist of an equal number of lanes as the other sub-groups. The lanes of a sub-group may be contiguous, i.e., spanning a range from a least-significant bit to a most-significant bit. A system in which the lanes are divided into N sub-groups may be reconfigured in response to detection of erroneous operation of some of the sub-groups but not others. For example, a system having four sub-groups of four lanes each could be reconfigured to multiplex all of the functional data over one of the sub-groups of four lanes, with the remaining three sub-groups excluded from functional operation. When reconfigured in this manner, such a system would be configured to transmit the functional data at a rate of one-fourth the full data rate. More generally, a system in which the lanes are divided in a predetermined manner into N sub-groups could be reconfigured to transmit data at a rate of 1/N times the full data rate. Advantageously, even though some lanes may be unusable or excluded, all of the functional data may continue to be transmitted between dies following the reconfiguring of the system, albeit at a reduced data rate.

Figure 8:
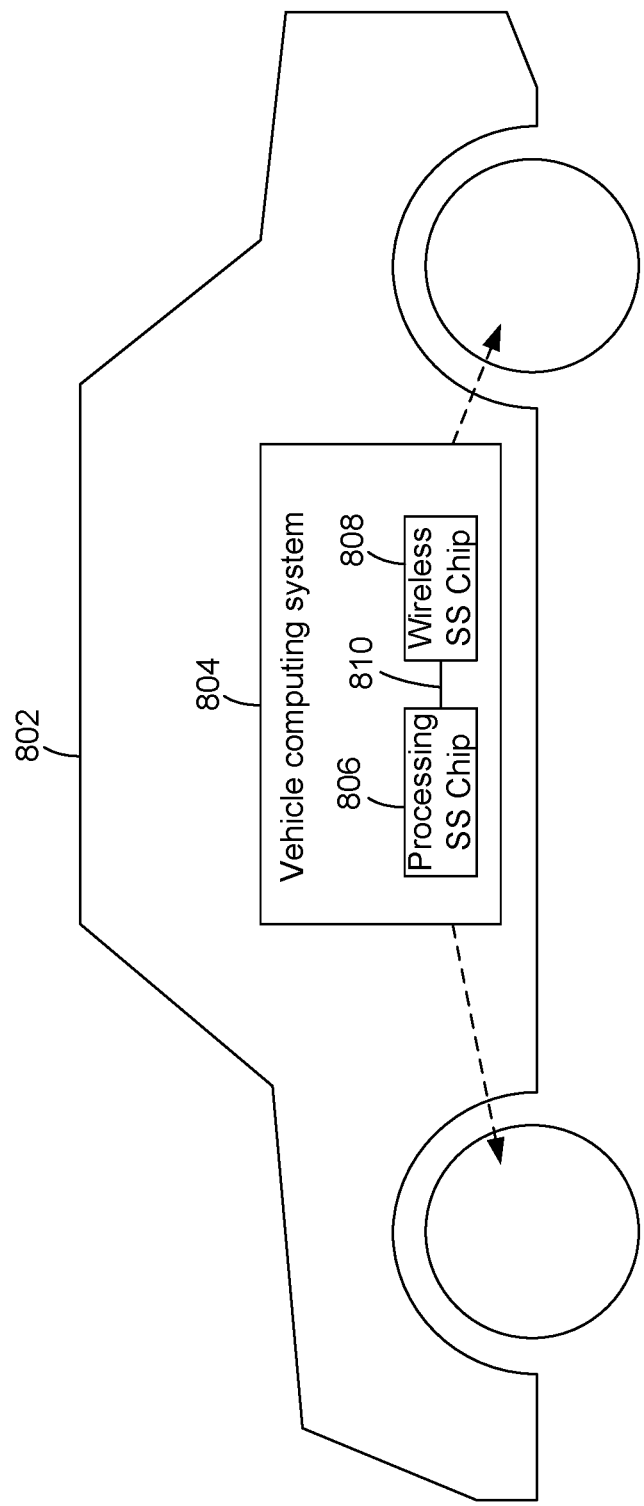
FIG. 8 illustrates a vehicle having a device with a configurable die-to-die serial data link, in accordance with exemplary embodiments.

As shown in FIG. 8, an automobile or other vehicle 802 may contain a computing system 804 having a first die 806 and a second die 808 configured to communicate data via a D2D serial data link 810. The first die 806 may comprise, for example, a processing subsystem ("SS") having one or more processors. The second die 808 may comprise, for example, a wireless connectivity subsystem (e.g., cellular transceiver, etc.) for so-called vehicle-to-vehicle ("V2V") or vehicle-to-anything ("V2X") data communication. Nevertheless, these are only a few examples of various categories of die functionality that may be provided in a vehicle computing system, as understood by one of ordinary skill in the art. The first and second dies 806 and 808 may include the features described above with regard to any of the above-described pairs of dies 102 and 104 (FIG. 1), 302 and 304 (FIG. 3), etc., and may operate in accordance with any of the above-described methods 200 (FIG. 2), 400 (FIGS. 4A-4D), etc. Although only one computing system 804, containing two dies 806 and 808 and one D2D serial data link 810 are shown, there could be any number of additional dies and die-to-die serial data links between or among any of the dies, which could be contained in any number of computing systems.

Although referred to as "dies" for convenience, the first and second dies 806 and 808 may be packaged in any manner. The D2D serial data link 810 may include conductors between die packages, such as, for example, traces on a printed circuit board, or wires, etc. In an example in which the first and second dies 806 and 808 are co-packaged within a multi-chip module (not shown), the D2D serial data link 810 may also be packaged within the multi-chip module.

The computing system 804 may provide functions that include, for example, aspects of controlling operation of the vehicle 802, as conceptually indicated by broken-line arrows. The vehicle 802 may at times during its operation be subjected to harsh environmental conditions or effects, such as radiation from solar flares or other sources, cosmic rays, extreme temperatures, etc. Such environmental conditions or effects may cause data bits being transmitted over the D2D serial data link 810 to become corrupted, i.e., for bits transmitted by one of the dies 806 and 808 to be received incorrectly or erroneously by the other of the dies 808 and 806, respectively. Such incorrect or erroneous operation of the link 810 may cause incorrect operation of the computing system 804 and may lead to an unsafe condition for occupants of the vehicle 802 or other persons or property.

In accordance with the solutions described above, erroneous operation of the link 810 may be detected when the vehicle 802 is being prepared for operation (e.g., during booting of the computing system 804), during operation of the vehicle 802, or at other times. Further in accordance with the solutions described above, the link 810 may be dynamically configured (or reconfigured) upon detection of such erroneous operation to avoid the use of lanes of the link 810 on which data bits may have been corrupted and to use the remaining lanes of the link 810 during operation of the vehicle. The link 810 may thus remain operable, but in some examples at a reduced data rate. In an example in which the computing system 804 controls aspects of operation of the vehicle 802, and in which the link 810 has been reconfigured to operate at a reduced data rate, the computing system 804 or a related system (not shown) may, for example, transition the vehicle 802 into a fail-safe driving mode (e.g., limiting maximum speed, etc.). In addition, or alternatively, the computing system 804 or a related system may issue a safety warning or alert to the vehicle driver or others.

Nevertheless, the systems, methods and other solutions described above are not limited to mitigating effects caused by environmental conditions and may be applied regardless of the cause of the erroneous operation of the link 810. Further, the systems, methods and other solutions described herein are not limited to vehicles or other safety-critical systems and may be applied in other contexts.

Implementation examples are described in the following numbered clauses:

1. A method for dynamically configuring a die-to-die serial data link, comprising:

transmitting, by a first die, a test data pattern over a plurality of first-die-to-second-die lanes of the die-to-die serial data link in response to a test mode, the die-to-die serial data link comprising the plurality of first-die-to-second-die lanes and a plurality of second-die-to-first-die lanes;

receiving, by a second die, a received data pattern on the first-die-to-second-die lanes in response to the test mode;

determining, by the second die, a number of mismatched bits between the received data pattern and a predetermined data pattern;

configuring, by the second die, a second-die receive path to use all of the plurality of first-die-to-second-die lanes when there are no more than a threshold number of mismatched bits;

determining, by the second die, a sub-group of the first-die-to-second-die lanes not associated with mismatched bits when there are more than the threshold number of mismatched bits; and configuring, by the second die, the second-die receive path to use the sub-group of first-die-to-second-die lanes when there are more than the threshold number of mismatched bits.

2. The method of clause 1, further comprising:

transmitting, by the second die, link test result information over the second-die-to-first-die lanes indicating the sub-group of first-die-to-second-die lanes when there are more than the threshold number of mismatched bits and indicating all of the plurality of first-die-to-second-die lanes when there are no more than the threshold number of mismatched bits;

receiving, by the first die, the link test result information on the second-die-to-first-die lanes;

configuring, by the first die, a first-die transmit path to use all of the plurality of first-die-to-second-die lanes when the link test result information indicates all of the plurality of first-die-to-second-die lanes; and configuring, by the first die, the first-die transmit path to use the sub-group of first-die-to-second-die lanes when the link test result information indicates the sub-group of first-die-to-second-die lanes.

3. The method of clause 2, wherein configuring the first-die transmit path to use the sub-group of first-die-to-second-die lanes comprises multiplexing all of the first-die transmit path onto the sub-group of first-die-to-second-die lanes.

4. The method of clause 3, wherein determining the sub-group of first-die-to-second-die lanes comprises selecting the sub-group from a plurality (N) of predetermined sub-groups, each predetermined sub-group consisting of an equal number of lanes.

5. The method of clause 4, further comprising:

after configuring the first-die transmit path to use all of the plurality of first-die-to-second-die lanes, transmitting functional data over all of the plurality of first-die-to-second-die lanes at a full data rate; and after configuring the first-die transmit path to use the sub-group of first-die-to-second-die lanes, transmitting the functional data over the sub-group of first-die-to-second-die lanes at a reduced data rate of 1/N times the full data rate.

6. The method of any of clauses 1-5, wherein the lanes of each predetermined sub-group are contiguous with each other.

7. The method of any of clauses 1-6, wherein all of the plurality of first-die-to-second-die lanes collectively consist of two predetermined sub-groups.

8. The method of any of clauses 1-7, further comprising providing the test mode during a booting process of a computing device containing the first die and the second die.

9. The method of any of clauses 1-8, further comprising:

transmitting functional data over the first-die-to-second-die lanes when the second-die receive path is configured to use all of the plurality of first-die-to-second-die lanes;

performing error detection and correction on the functional data at the second die, including determining a number of correctable errors;

comparing the number of correctable errors during a time interval with an error rate threshold; and providing the test mode when the number of correctable errors during the time interval exceeds the error rate threshold.

10. A system for dynamically configuring a die-to-die serial data link, comprising:

first control and self-test circuitry in a first die configured to transmit a test data pattern over a plurality of first-die-to-second-die lanes in response to a test mode, the die-to-die serial data link comprising the plurality of first-die-to-second-die lanes and a plurality of second-die-to-first-die lanes;

second control and self-test circuitry in a second die configured to, in response to the test mode, receive a received data pattern on the first-die-to-second-die lanes, determining a number of mismatched bits between the received data pattern and a predetermined data pattern, and determine a sub-group of the first-die-to-second-die lanes not associated with mismatched bits when there are more than the threshold number of mismatched bits; and second routing circuitry in the second die configured to configure a second-die receive path to use all of the plurality of first-die-to-second-die lanes when there are no more than a threshold number of mismatched bits and to configure the second-die receive path to use the sub-group of first-die-to-second-die lanes when there are more than the threshold number of mismatched bits.

11. The system of clause 10, further comprising first routing circuitry in the first die, and wherein:

the second control and self-test circuitry is further configured to transmit link test result information over the second-die-to-first-die lanes, the link test result information indicating the sub-group of first-die-to-second-die lanes when there are more than the threshold number of mismatched bits and indicating all of the first-die-to-second-die lanes when there are no more than the threshold number of mismatched bits; and the first routing circuitry is configured to configure a first-die transmit path to use all of the plurality of lanes when the link test result information indicates all of the first-die-to-second-die lanes, and to configure the first-die transmit path to use the sub-group of first-die-to-second-die lanes when the link test result information indicates the sub-group of first-die-to-second-die lanes.

12. The system of clause 11, wherein the first routing circuitry is configured to configure the first-die transmit path to use the sub-group of first-die-to-second-die lanes by being configured to multiplex all of the first-die transmit path onto the sub-group of first-die-to-second-die lanes.

13. The system of clause 12, wherein the second control and self-test circuitry is configured to determine the sub-group of first-die-to-second-die lanes by being configured to select the sub-group from a plurality (N) of predetermined sub-groups, each predetermined sub-group consisting of an equal number of lanes.

14. The system of clause 13, further comprising device-to-device controller circuitry configured to:

transmit functional data over all of the plurality of first-die-to-second-die lanes at a full data rate when the first-die transmit path is configured to use all of the plurality of first-die-to-second-die lanes; and transmit the functional data over the sub-group of first-die-to-second-die lanes at a reduced data rate of 1/N times the full data rate when the first-die transmit path is configured to use the sub-group of first-die-to-second-die lanes.

15. The system of any of clauses 10-14, wherein the lanes of each predetermined sub-group are contiguous with each other.

16. The system of any of clauses 10-15, wherein all of the plurality of first-die-to-second-die lanes collectively consist of two predetermined sub-groups.
17. The system of any of clauses 10-16, wherein the first die and the second die are included in a computing device, and the test mode is provided during a booting process of the computing device.
18. The system of any of clauses 10-17, further comprising:
device-to-device controller circuitry in the first die configured to transmit functional data over the die-to-die serial data link from the first die to the second die when the first-die transmit path is configured to use all of the plurality of first-die-to-second-die lanes; and
error detection and correction circuitry in the second die configured to perform error detection and correction on functional data received at the second die, including to determine a number of correctable errors;
wherein the device-to-device controller circuitry in the second die is further configured to compare the number of correctable errors during a time interval with an error rate threshold and to provide the test mode when the number of correctable errors during the time interval exceeds the error rate threshold.
19. A system for dynamically configuring a serial data link between a first die and a second die, the system comprising:
first serializer circuitry in the first die, the first serializer circuitry having an output coupled to first-die-to-second-die lanes of the serial data link;
first multiplexing circuitry in the first die, the first multiplexing circuitry having an output coupled to an input of the first serializer circuitry;
first self-test generator circuitry in the first die, the first self-test generator circuitry configured to provide a test data pattern to the first multiplexing circuitry in response to a test mode;
first deserializer circuitry in the first die, the first deserializer circuitry having an input coupled to second-die-to-first-die lanes of the serial data link;
first demultiplexing circuitry in the first die, the first demultiplexing circuitry having an input coupled to an output of the first deserializer circuitry; and
first control circuitry in the first die, the first control circuitry configured to receive link test result information indicating a group of lanes in response to the test mode, the first control circuitry further configured to use the first multiplexing circuitry to configure a first-die transmit path to use all first-die-to-second-die lanes when the group of lanes indicated by the link test result information consists all first-die-to-second-die lanes, and configure the first-die transmit path to use a sub-group of the first-die-to-second-die lanes when the group of lanes indicated by the link test result information consists of the sub-group of the first-die-to-second-die lanes.
20. The system of clause 19, further comprising:
second deserializer circuitry in the second die, the second deserializer circuitry having an input coupled to the first-die-to-second-die lanes of the serial data link;
second demultiplexing circuitry in the second die, the second demultiplexing circuitry having an input coupled to an output of the second deserializer circuitry; and
second control circuitry in the second die, the second control circuitry configured to, in response to the test mode, receive a received data pattern from the second demultiplexing circuitry, determining a number of mismatched bits between the received data pattern and a predetermined data pattern, and provide the link test result information, wherein the group of lanes indicated by the link test result information consists of all first-die-to-second-die lanes when there are no more than a threshold number of mismatched bits, and wherein the sub-group of lanes indicated by the link test result information consists of first-die-to-second-die lanes not associated with the mismatched bits when there are more than the threshold number of mismatched bits.
21. The system of clause 20, wherein the first control circuitry is configured to configure the first-die transmit path to use the sub-group of the first-die-to-second-die lanes by being configured to multiplex all of the first-die transmit path onto the sub-group of the first-die-to-second-die lanes.
22. The system of clause 21, wherein the second control circuitry is configured to provide the link test result information by being configured to select the sub-group from a plurality (N) of predetermined sub-groups, each predetermined sub-group consisting of an equal number of lanes.
23. The system of clause 22, further comprising device-to-device controller circuitry configured to:
transmit functional data over all of the plurality of first-die-to-second-die lanes at a full data rate when the first-die transmit path is configured to use all of the plurality of first-die-to-second-die lanes; and
transmit the functional data over the sub-group of first-die-to-second-die lanes at a reduced data rate of 1/N times the full data rate when the first-die transmit path is configured to use the sub-group of the first-die-to-second-die lanes.
24. The system of any of clauses 19-23, wherein the lanes of each predetermined sub-group are contiguous with each other.
25. The system of any of clauses 19-24, wherein all of the plurality of first-die-to-second-die lanes collectively consist of two predetermined sub-groups.
26. A system for dynamically configuring a die-to-die serial data link, comprising:
means for transmitting a test data pattern over first-die-to-second-die lanes of the die-to-die serial data link in response to a test mode;
means for receiving a received data pattern on the first-die-to-second-die lanes in response to the test mode;
means for determining a number of mismatched bits between the received data pattern and a predetermined data pattern;
means for configuring a second-die receive path to use all of the plurality of first-die-to-second-die lanes when there are no more than a threshold number of mismatched bits;
means for determining a sub-group of the first-die-to-second-die lanes not associated with mismatched bits when there are more than the threshold number of mismatched bits; and
means for configuring the second-die receive path to use the sub-group of first-die-to-second-die lanes when there are more than the threshold number of mismatched bits.
27. The system of clause 26, further comprising:
means for transmitting link test result information over the second-die-to-first-die lanes indicating the sub-group of first-die-to-second-die lanes when there are more than the threshold number of mismatched bits and indicating all of the plurality of first-die-to-second-die lanes when there are no more than the threshold number of mismatched bits; and means for receiving the link test result information, for configure a first-die transmit path to use all of the plurality of first-die-to-second-die lanes when the link test result information indicates all of the plurality of first-die-to-second-die lanes, and for configuring the first-die transmit path to use the sub-group of first-die-to-second-die lanes when the link test result information indicates the sub-group of first-die-to-second-die lanes.

28. The system of clause 27, wherein the means for configuring the first-die transmit path to use the sub-group of first-die-to-second-die lanes comprises multiplexing all of the first-die transmit path onto the sub-group of first-die-to-second-die lanes.

29. The system of clause 28, wherein the means for determining the sub-group of first-die-to-second-die lanes comprises means for selecting the sub-group from a plurality (N) of predetermined sub-groups, each predetermined sub-group consisting of an equal number of lanes.

30. The system of clause 29, further comprising:

means for transmitting functional data over all of the plurality of first-die-to-second-die lanes at a full data rate when the first-die transmit path is configured to use all of the plurality of first-die-to-second-die lanes; and means for transmitting the functional data over the sub-group of first-die-to-second-die lanes at a reduced data rate of 1/N times the full data rate when the first-die transmit path is configured to use the sub-group of first-die-to-second-die lanes.

Alternative embodiments will become apparent to one of ordinary skill in the art to which the invention pertains. Therefore, although selected aspects have been illustrated and described in detail, it will be understood that various substitutions and alterations may be made therein.

What is claimed is:

1. A method for dynamically configuring a die-to-die serial data link, comprising:
    transmitting, by a first die, a test data pattern over a plurality of first-die-to-second-die lanes of the die-to-die serial data link in response to a test mode, the link comprising the plurality of first-die-to-second-die lanes and a plurality of second-die-to-first-die lanes;
    receiving, by a second die, a received data pattern on the first-die-to-second-die lanes in response to the test mode;
    determining, by the second die, a number of mismatched bits between the received data pattern and a predetermined data pattern;
    configuring, by the second die, a second-die receive path to use all of the plurality of first-die-to-second-die lanes when there are no more than a threshold number of mismatched bits;
    determining, by the second die, a sub-group of the first-die-to-second-die lanes not associated with mismatched bits when there are more than the threshold number of mismatched bits; and
    configuring, by the second die, the second-die receive path to use the sub-group of first-die-to-second-die lanes when there are more than the threshold number of mismatched bits.

2. The method of claim 1, further comprising:
    transmitting, by the second die, link test result information over the second-die-to-first-die lanes indicating the sub-group of first-die-to-second-die lanes when there are more than the threshold number of mismatched bits and indicating all of the plurality of first-die-to-second-die lanes when there are no more than the threshold number of mismatched bits;
    receiving, by the first die, the link test result information on the second-die-to-first-die lanes;
    configuring, by the first die, a first-die transmit path to use all of the plurality of first-die-to-second-die lanes when the link test result information indicates all of the plurality of first-die-to-second-die lanes; and
    configuring, by the first die, the first-die transmit path to use the sub-group of first-die-to-second-die lanes when the link test result information indicates the sub-group of first-die-to-second-die lanes.

3. The method of claim 2, wherein configuring the first-die transmit path to use the sub-group of first-die-to-second-die lanes comprises multiplexing all of the first-die transmit path onto the sub-group of first-die-to-second-die lanes.

4. The method of claim 3, wherein determining the sub-group of first-die-to-second-die lanes comprises selecting the sub-group from a plurality (N) of predetermined sub-groups, each predetermined sub-group consisting of an equal number of lanes.

5. The method of claim 4, further comprising:
    after configuring the first-die transmit path to use all of the plurality of first-die-to-second-die lanes, transmitting functional data over all of the plurality of first-die-to-second-die lanes at a full data rate; and
    after configuring the first-die transmit path to use the sub-group of first-die-to-second-die lanes, transmitting the functional data over the sub-group of first-die-to-second-die lanes at a reduced data rate of 1/N times the full data rate.

6. The method of claim 4, wherein the lanes of each predetermined sub-group are contiguous with each other.

7. The method of claim 6, wherein all of the plurality of first-die-to-second-die lanes collectively consist of two predetermined sub-groups.

8. The method of claim 1, further comprising providing the test mode during a booting process of a computing device containing the first die and the second die.

9. The method of claim 1, further comprising:
    transmitting functional data over the first-die-to-second-die lanes when the second-die receive path is configured to use all of the plurality of first-die-to-second-die lanes;
    performing error detection and correction on the functional data at the second die, including determining a number of correctable errors;
    comparing the number of correctable errors during a time interval with an error rate threshold; and
    providing the test mode when the number of correctable errors during the time interval exceeds the error rate threshold.

10. A system for dynamically configuring a die-to-die serial data link, comprising:
    first control and self-test circuitry in a first die configured to transmit a test data pattern over a plurality of first-die-to-second-die lanes in response to a test mode, the die-to-die serial data link comprising the plurality of first-die-to-second-die lanes and a plurality of second-die-to-first-die lanes;
    second control and self-test circuitry in a second die configured to, in response to the test mode, receive a received data pattern on the first-die-to-second-die lanes, determine a number of mismatched bits between the received data pattern and a predetermined data pattern, and determine a sub-group of the first-die-to-second-die lanes not associated with mismatched bits when there are more than the threshold number of mismatched bits; and second routing circuitry in the second die configured to configure a second-die receive path to use all of the plurality of first-die-to-second-die lanes when there are no more than a threshold number of mismatched bits and to configure the second-die receive path to use the sub-group of first-die-to-second-die lanes when there are more than the threshold number of mismatched bits.

11. The system of claim 10, further comprising first routing circuitry in the first die, and wherein:

the second control and self-test circuitry is further configured to transmit link test result information over the second-die-to-first-die lanes, the link test result information indicating the sub-group of first-die-to-second-die lanes when there are more than the threshold number of mismatched bits and indicating all of the first-die-to-second-die lanes when there are no more than the threshold number of mismatched bits; and the first routing circuitry is configured to configure a first-die transmit path to use all of the plurality of lanes when the link test result information indicates all of the first-die-to-second-die lanes, and to configure the first-die transmit path to use the sub-group of first-die-to-second-die lanes when the link test result information indicates the sub-group of first-die-to-second-die lanes.

12. The system of claim 11, wherein the first routing circuitry is configured to use in the first-die transmit path the sub-group of first-die-to-second-die lanes by being configured to multiplex all of the first-die transmit path onto the sub-group of first-die-to-second-die lanes.

13. The system of claim 12, wherein the second control and self-test circuitry is configured to determine the sub-group of first-die-to-second-die lanes by being configured to select the sub-group from a plurality (N) of predetermined sub-groups, each predetermined sub-group consisting of an equal number of lanes.

14. The system of claim 13, further comprising device-to-device controller circuitry configured to:

transmit functional data over all of the plurality of first-die-to-second-die lanes at a full data rate when the first-die transmit path is configured to use all of the plurality of first-die-to-second-die lanes; and transmit the functional data over the sub-group of first-die-to-second-die lanes at a reduced data rate of 1/N times the full data rate when the first-die transmit path is configured to use the sub-group of first-die-to-second-die lanes.

15. The system of claim 13, wherein the lanes of each predetermined sub-group are contiguous with each other.

16. The system of claim 15, wherein all of the plurality of first-die-to-second-die lanes collectively consist of two predetermined sub-groups.

17. The system of claim 10, wherein the first die and the second die are included in a computing device, and the test mode is provided during a booting process of the computing device.

18. The system of claim 11, further comprising:

device-to-device controller circuitry in the first die configured to transmit functional data over the die-to-die serial data link from the first die to the second die when the first-die transmit path is configured to use all of the plurality of first-die-to-second-die lanes; and error detection and correction circuitry in the second die configured to perform error detection and correction on functional data received at the second die, including to determine a number of correctable errors;

wherein the device-to-device controller circuitry in the second die is further configured to compare the number of correctable errors during a time interval with an error rate threshold and to provide the test mode when the number of correctable errors during the time interval exceeds the error rate threshold.

19. A system for dynamically configuring a die-to-die serial data link, comprising:

means for transmitting a test data pattern over first-die-to-second-die lanes of the die-to-die serial data link in response to a test mode;

means for receiving a received data pattern on the first-die-to-second-die lanes in response to the test mode;

means for determining a number of mismatched bits between the received data pattern and a predetermined data pattern;

means for coupling a second-die receive path to all of the plurality of first-die-to-second-die lanes when there are no more than a threshold number of mismatched bits;

means for determining a sub-group of the first-die-to-second-die lanes not associated with mismatched bits when there are more than the threshold number of mismatched bits; and means for configuring the second-die receive path to use the sub-group of first-die-to-second-die lanes when there are more than the threshold number of mismatched bits.

20. The system of claim 19, further comprising:

means for transmitting link test result information over the second-die-to-first-die lanes indicating the sub-group of first-die-to-second-die lanes when there are more than the threshold number of mismatched bits and indicating all of the plurality of first-die-to-second-die lanes when there are no more than the threshold number of mismatched bits; and means for receiving the link test result information, for configuring a first-die transmit path to use all of the plurality of first-die-to-second-die lanes when the link test result information indicates all of the plurality of first-die-to-second-die lanes, and for configuring the first-die transmit path to use the sub-group of first-die-to-second-die lanes when the link test result information indicates the sub-group of first-die-to-second-die lanes.

21. The system of claim 20, wherein the means for configuring the first-die transmit path to use the sub-group of first-die-to-second-die lanes comprises means for multiplexing all of the first-die transmit path onto the sub-group of first-die-to-second-die lanes.

22. The system of claim 21, wherein the means for determining the sub-group of first-die-to-second-die lanes comprises means for selecting the sub-group from a plurality (N) of predetermined sub-groups, each predetermined sub-group consisting of an equal number of lanes.

23. The system of claim 22, further comprising:

means for transmitting functional data over all of the plurality of first-die-to-second-die lanes at a full data rate when the first-die transmit path is configured to use all of the plurality of first-die-to-second-die lanes; and means for transmitting the functional data over the sub-group of first-die-to-second-die lanes at a reduced data rate of 1/N times the full data rate when the first-die transmit path is configured to use the sub-group of first-die-to-second-die lanes.

* * * * *